US011967751B2

(12) United States Patent
Park et al.

(10) Patent No.: US 11,967,751 B2
(45) Date of Patent: Apr. 23, 2024

(54) ANTENNA MODULE AND ELECTRONIC DEVICE INCLUDING THE SAME

(71) Applicant: Samsung Electronics Co., Ltd., Suwon-si (KR)

(72) Inventors: Seongjin Park, Suwon-si (KR); Dongyeon Kim, Suwon-si (KR); Hosaeng Kim, Suwon-si (KR); Sumin Yun, Suwon-si (KR); Myunghun Jeong, Suwon-si (KR); Jehun Jong, Suwon-si (KR); Jaehoon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 17/335,527

(22) Filed: Jun. 1, 2021

(65) Prior Publication Data

US 2021/0288393 A1 Sep. 16, 2021

Related U.S. Application Data

(63) Continuation of application No. 16/884,513, filed on May 27, 2020, now Pat. No. 11,024,943.

(30) Foreign Application Priority Data

May 27, 2019 (KR) ........................ 10-2019-0061851

(51) Int. Cl.
*H01Q 1/24* (2006.01)
*H01Q 9/04* (2006.01)
(Continued)

(52) U.S. Cl.
CPC ............. *H01Q 1/24* (2013.01); *H01Q 9/0421* (2013.01); *H01Q 9/16* (2013.01)

(58) Field of Classification Search
CPC .......... H01Q 1/24; H01Q 1/241; H01Q 1/242; H01Q 1/243; H01Q 1/36; H01Q 1/38;
(Continued)

(56) References Cited

U.S. PATENT DOCUMENTS 6,239,764 B1 5/2001 Timofeev et al.
6,424,300 B1 * 7/2002 Sanford ................. H01Q 1/243 343/702
(Continued)

FOREIGN PATENT DOCUMENTS

KR 10-2017-0101310 A 9/2017
KR 10-2018-0017667 A 2/2018
(Continued)

OTHER PUBLICATIONS

Korean Office Action dated May 12, 2023, issued in a Korean Patent Application No. 10-2019-0061851.
(Continued)

*Primary Examiner* — Quochien B Vuong
(74) *Attorney, Agent, or Firm* — Jefferson IP Law, LLP

(57) ABSTRACT

An electronic device including a housing, a display, an antenna structure positioned inside the housing, and a wireless communication circuit connected to the antenna structure, is provided. The antenna structure includes a dipole antenna element interposed between s-patch elements not to overlap with s-patch elements.

26 Claims, 19 Drawing Sheets

(51) Int. Cl.

*H01Q 9/06* (2006.01)
*H01Q 9/16* (2006.01)
*H04M 1/02* (2006.01)

(58) Field of Classification Search

CPC ........ H01Q 9/0421; H01Q 9/16; H01Q 21/24; H01Q 21/28; H04M 1/02; H04M 1/0202; H04M 1/0266; H04M 1/0277

See application file for complete search history.

(56) References Cited

U.S. PATENT DOCUMENTS

| | | | |
|---|---|---|---|
| 9,553,361 | B2 | 1/2017 | Hu et al. |
| 9,653,818 | B2 | 5/2017 | Mohammadian et al. |
| 10,381,749 | B2 | 8/2019 | Park et al. |
| 10,418,687 | B2 | 9/2019 | Mow et al. |
| 10,608,321 | B2 * | 3/2020 | Jiang .................... H01Q 9/0421 |
| 10,608,336 | B2 | 3/2020 | Chen et al. |
| 10,833,425 | B2 | 11/2020 | Park et al. |
| 10,910,708 | B2 | 2/2021 | Chen et al. |
| 11,024,953 | B2 * | 6/2021 | Sato ......................... H01Q 1/38 |
| 11,114,771 | B2 | 9/2021 | Park et al. |
| 2006/0284770 | A1 | 12/2006 | Jo et al. |
| 2009/0174615 | A1 * | 7/2009 | Tsujimura .............. H01Q 1/243 343/702 |
| 2012/0306721 | A1 | 12/2012 | Okegawa et al. |
| 2013/0257672 | A1 | 10/2013 | Lu et al. |
| 2016/0248169 | A1 | 8/2016 | Mohammadian et al. |
| 2017/0141468 | A1 | 5/2017 | Hu et al. |
| 2018/0026341 | A1 | 1/2018 | Mow et al. |
| 2018/0048075 | A1 | 2/2018 | Park et al. |
| 2019/0006751 | A1 | 1/2019 | Chen et al. |
| 2019/0363458 | A1 | 11/2019 | Park et al. |
| 2020/0014095 | A1 | 1/2020 | Mow et al. |
| 2020/0163204 | A1 | 5/2020 | Kim et al. |
| 2020/0227823 | A1 | 7/2020 | Chen et al. |
| 2021/0013631 | A1 | 1/2021 | Jo et al. |
| 2021/0013633 | A1 | 1/2021 | Park et al. |

FOREIGN PATENT DOCUMENTS

| | | | |
|---|---|---|---|
| KR | 10-2019-0001741 | A | 1/2019 |
| WO | 2018/170969 | A | 9/2018 |

OTHER PUBLICATIONS

International Search Report dated Sep. 28, 2020, issued in International Application No. PCT/KR2020/006847.

Extended European Search Report dated Feb. 14, 2022, issued in European Patent Application No. 20813156.5-1205.

* cited by examiner

ANTENNA MODULE AND ELECTRONIC DEVICE INCLUDING THE SAME

CROSS-REFERENCE TO RELATED APPLICATION(S)

This application is a continuation application of prior application Ser. No. 16/884,513, filed on May 27, 2020, and is based on and claims priority under 35 U.S.C. § 119(a) of a Korean patent application number 10-2019-0061851, filed on May 27, 2019, in the Korean Intellectual Property Office, the disclosure of which is incorporated by reference herein its entirety.

BACKGROUND

1. Field

The disclosure relates to an antenna module and an electronic device including the same. More particularly, the disclosure relates to an antenna structure including a dipole antenna element interposed between s-patch elements not to overlap with s-patch elements.

2. Description of Related Art

With the development of a mobile communication technology, an electronic device equipped with an antenna, such as a smartphone or a wearable device, is being widely supplied. The electronic device may receive or transmit a signal including data (e.g., a message, a photo, a video, a music file, or a game) through the antenna.

The antenna of the electronic device may include a plurality of antenna elements to receive or transmit a signal more efficiently. For example, the electronic device may include one or more antenna arrays. Each of the one or more antennas may include a plurality of antenna elements arranged in a specific direction.

To improve data throughput, a wireless signal of a relatively high frequency band may be used. Because the antenna may show different characteristics depending on the frequency of a signal, different antennas may be used depending on the used frequency band. For example, an electronic device may use different antennas for a signal having the frequency below about 6 gigahertz (GHz) and a signal having the frequency above about 6 GHz.

To receive high-frequency signals (e.g., signals with frequencies above 6 GHz), a plurality of antenna modules may be positioned in the electronic device such that a coverage of the electronic device is capable of covering the omni-direction of the electronic device. The electronic device may have the limited mounting space inside its housing due to the miniaturization and multifunction of the electronic device. For example, the size of the mounting space may be limited due to the size of the antenna module.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an antenna module having the reduced size and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first plate, a second plate facing away from the first plate, and a side member surrounding a space between the first plate and the second plate and coupled with the second plate or integrally formed with the second plate, a display viewable through at least part of the first plate, an antenna structure disposed inside the housing, and a wireless communication circuit. The antenna structure may include a first conductive layer, a second conductive layer, a first conductive path, a second conductive path, a third conductive path, a fourth conductive path, a first conductive pattern, and a second conductive pattern. The first conductive layer may include a first surface facing a first direction, a second surface facing a second direction opposite to the first direction, and a first periphery extending in a third direction perpendicular to the first direction, and may further include a first region protruding in a fourth direction perpendicular to the third direction from a first portion of the first periphery and a second region spaced from the first region in the third direction by a first distance and protruding in the fourth direction from a second portion of the first periphery. The second conductive layer may be spaced from the first conductive layer and facing the first conductive layer. The second conductive layer may include a third surface facing the first direction, a fourth surface facing the second direction, and a second periphery extending in the third direction, and may further include a third region protruding in the fourth direction from the second periphery to face the first region, and a fourth region spaced from the third region in the third direction by a second distance and protruding in the fourth direction from the second periphery to face the second region. The first conductive path may overlap with the first region, may partially extend in the fourth direction to be closer to the first conductive layer than the second conductive layer, and may be electrically connected to the third region, when viewed from above the first surface. The second conductive path may overlap with the second region, may partially extend in the fourth direction to be closer to the first conductive layer than the second conductive layer, and may be electrically connected to the fourth region, when viewed from above the first surface. The third conductive path may be interposed between the first region and the second region and may extend in the fourth direction, when viewed from above the first surface. The fourth conductive path may be interposed between the first region and the second region and may be adjacent to the third conductive path to extend in the fourth direction, when viewed from above the first surface. The first conductive pattern may extend from an end of the third conductive path in a fifth direction opposite to the third direction. The second conductive pattern may extend from an end of the fourth conductive path in the third direction. The wireless communication circuit may be electrically connected to at least one of the first conductive path, the second conductive path, the third conductive path, and the fourth conductive path and transmitting and/or receiving a signal having a frequency between 3 gigahertz (GHz) and 100 GHz.

In accordance with another aspect of the disclosure, an antenna module is provided. The antenna module includes an antenna structure and a wireless communication circuit. The antenna structure may include a first conductive layer, a second conductive layer, a first conductive path, a second conductive path, a third conductive path, a fourth conductive path, a first conductive pattern, and a second conductive pattern. The first conductive layer may include a first surface facing a first direction, a second surface facing a second direction opposite to the first direction, and a first periphery extending in a third direction perpendicular to the first direction, and may further include a first region protruding in a fourth direction perpendicular to the third direction from a first portion of the first periphery and a second region spaced from the first region in the third direction by a first distance and protruding in the fourth direction from a second portion of the first periphery. The second conductive layer may be spaced from the first conductive layer and facing the first conductive layer. The second conductive layer may include a third surface facing the first direction, a fourth surface facing the second direction, and a second periphery extending in the third direction, and may further include a third region protruding in the fourth direction from the second periphery to face the first region, and a fourth region spaced from the third region in the third direction by a second distance and protruding in the fourth direction from the second periphery to face the second region. The first conductive path may overlap with the first region, may partially extend in the fourth direction to be closer to the first conductive layer than the second conductive layer, and may be electrically connected to the third region, when viewed from above the first surface. The second conductive path may overlap with the second region, may partially extend in the fourth direction to be closer to the first conductive layer than the second conductive layer, and may be electrically connected to the fourth region, when viewed from above the first surface. The third conductive path may be interposed between the first region and the second region and may extend in the fourth direction, when viewed from above the first surface. The fourth conductive path may be interposed between the first region and the second region and may be adjacent to the third conductive path to extend in the fourth direction, when viewed from above the first surface. The first conductive pattern may extend from an end of the third conductive path in a fifth direction opposite to the third direction. The second conductive pattern may extend from an end of the fourth conductive path in the third direction. The wireless communication circuit may be electrically connected to at least one of the first conductive path, the second conductive path, the third conductive path, and the fourth conductive path and transmitting and/or receiving a signal having a frequency between 3 GHz and 100 GHz.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
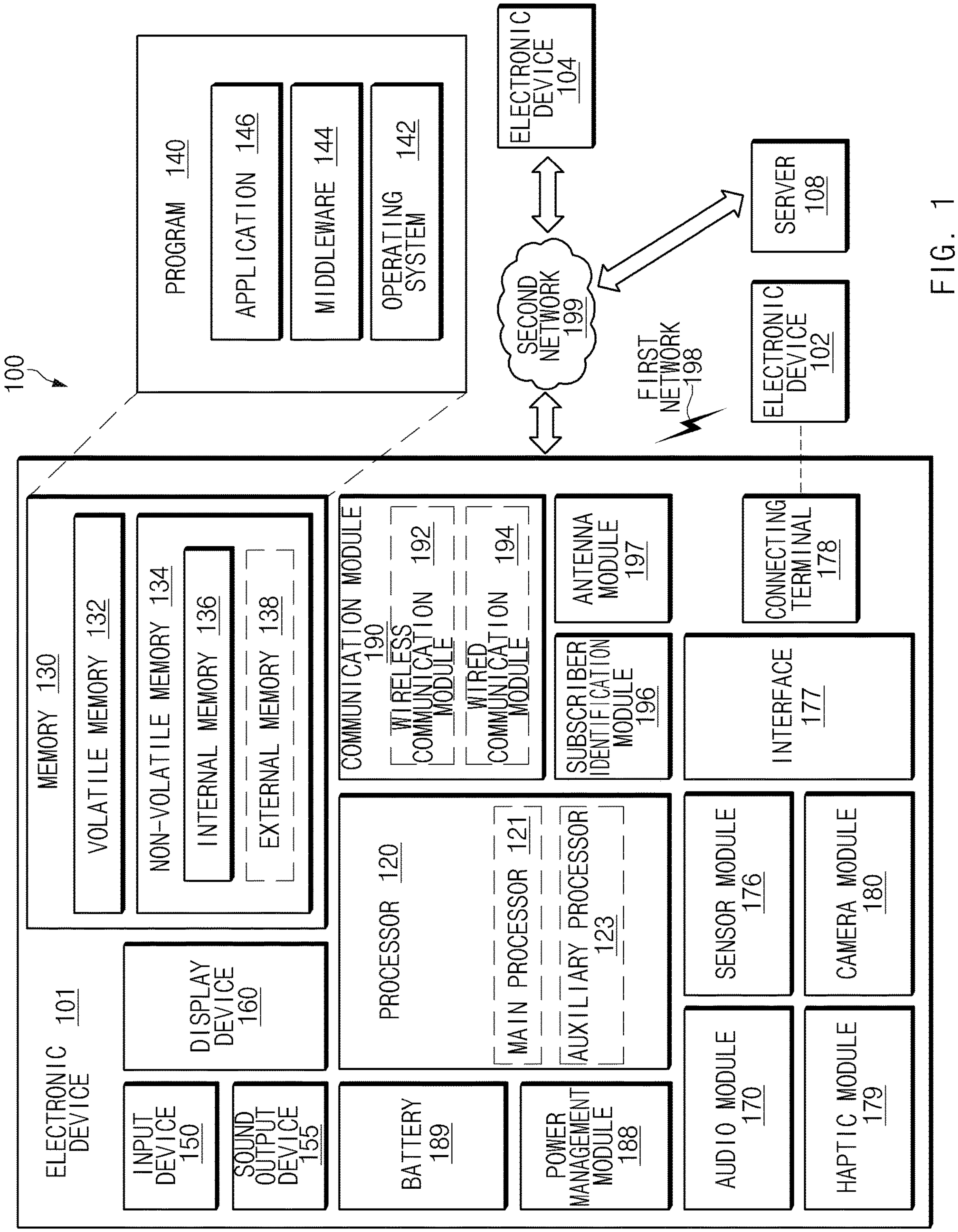
FIG. 1 is a block diagram of an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
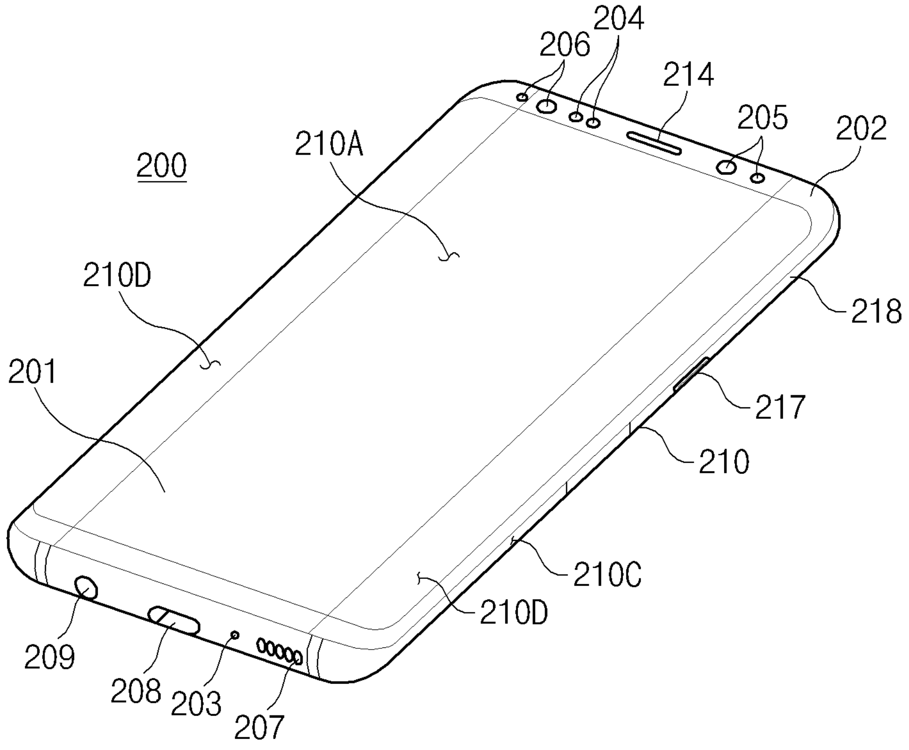
FIG. 2 is a perspective view of a mobile electronic device, according to an embodiment of the disclosure.
Figure 3:
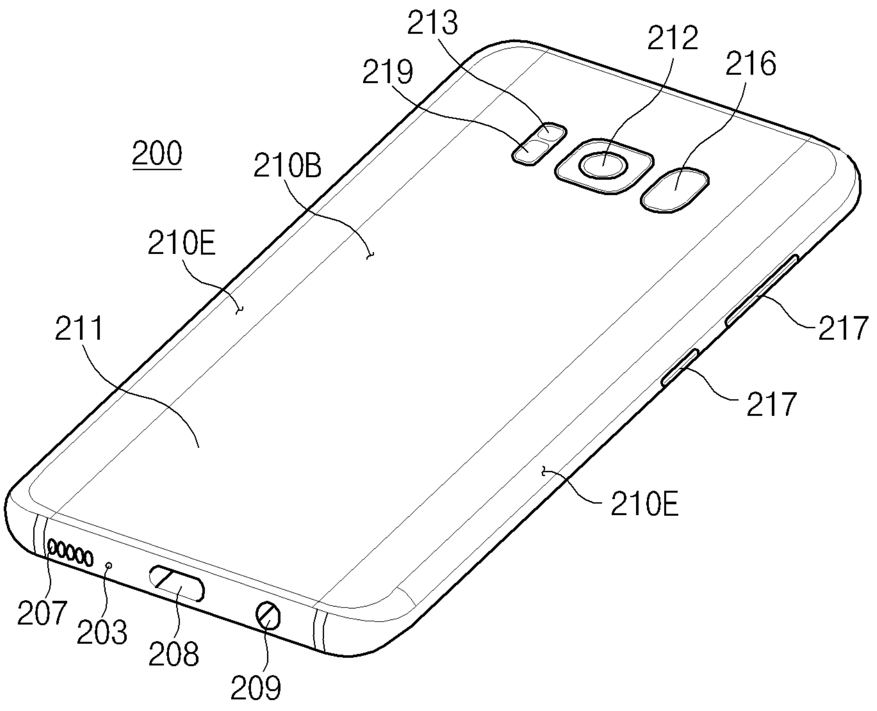
FIG. 3 is a perspective view of a rear surface of an electronic device, according to an embodiment of the disclosure.

FIG. 2 is a perspective view of a front surface of a mobile electronic device 200 (e.g., the electronic device 101 of FIG. 1), according to an embodiment of the disclosure. FIG. 3 is a perspective view of a rear surface of the mobile electronic device 200, according to an embodiment of the disclosure.

Referring to FIGS. 2 and 3, the mobile electronic device 200 (e.g., the electronic device 101 of FIG. 1) according to an embodiment may include a housing 210 which includes a first surface (or a front surface) 210A, a second surface (or a rear surface) 210B, and a side surface 210C surrounding a space between the first surface 210A and the second surface 210B. In an embodiment (not illustrated), the housing may be referred to as a "structure" which forms a part of the first surface 210A, the second surface 210B, and side surfaces 210C. According to an embodiment, the first surface 210A may be formed by a first plate (or a front plate) 202 (e.g., a glass plate including various coating layers, or a polymer plate), at least a portion of which is substantially transparent. The second surface 210B may be formed by a rear plate 211 which is substantially opaque. For example, the rear plate 211 may be implemented with a coated or colored glass, a ceramic, a polymer, a metal (e.g., aluminum, stainless steel (STS), or magnesium), or the combination of at least two of the materials. The side surface 210C may be coupled with the front plate 202 and the rear plate 211, and may be formed by a side bezel structure (or a "side member") 218 including metal and/or polymer. In any embodiment, the rear plate 211 and the side bezel structure 218 may be integrally formed and may include the same material (e.g., a metal material such as aluminum).

In the embodiment that is illustrated, the front plate 202 may include two first regions 210D, which are bent toward the rear plate 211 from the first surface 210A so as to be seamlessly extended, at opposite long edges of the front plate 202. In the embodiment (refer to FIG. 3) that is illustrated, the rear plate 211 may include two second regions 210E, which are bent toward the front plate 202 from the second surface 210B so as to be seamlessly extended, at opposite long edges thereof. In an embodiment, the front plate 202 (or the rear plate 211) may include only one of the first regions 210D (or the second regions 210E). In an embodiment, a portion of the first regions 210D or the second regions 210E may not be included. In the embodiments, when viewed from the side surface of the mobile electronic device 200, the side bezel structure 218 may have a first thickness (or width) on one side where the first region 210D or the second region 210E are not included, and may have a second thickness on one side where the first region 210D or the second region 210E are included. The second thickness may be smaller than the first thickness.

According to an embodiment, the mobile electronic device 200 may include at least one or more of a display 201, an audio module (comprising elements 203, 207, 214), a sensor module (comprising elements 204, 216, 219), a camera module (comprising elements 205, 212, 213), key input devices 217, a light-emitting device 206, and a connector hole (comprising elements 208, 209). In an embodiment, the mobile electronic device 200 may not include at least one (e.g., the key input devices 217 or the light-emitting device 206) of the components or may further include any other component.

The display 201 may be exposed through a considerable portion of the front plate 202, for example. In any embodiment, at least part of the display 201 may be exposed through the first surface 210A and the front plate 202 forming the first region 210D of the side surface 210C. In an embodiment, a corner of the display 201 may be formed to be mostly identical to a shape of an outer portion of the front plate 202 adjacent thereto. In an embodiment (not illustrated), to increase the area where the display 201 is exposed, a difference between an outer portion of the display 201 and an outer portion of the front plate 202 may be formed mostly identically.

In an embodiment (not illustrated), a recess or an opening may be formed in a portion of a screen display region of the display 201, and at least one or more of the audio module 214, the sensor module 204, the camera module (205, 212, 213), and the light-emitting device 206 may be provided to be aligned with the recess or the opening. In an embodiment (not illustrated), at least one or more of the audio module 214, the sensor module 204, the camera module (205, 212, 213), the fingerprint sensor 216, and the light-emitting device 206 may be provided on a back surface of the display 201, which corresponds to the screen display region. In an embodiment (not illustrated), the display 201 may be combined with a touch sensing circuit, a pressure sensor capable of measuring the intensity (or pressure) of a touch, and/or a digitizer capable of detecting a magnetic stylus pen or may be disposed adjacent thereto. In any embodiment, at least part of the sensor module (204, 219) and/or at least part of the key input device (217) may be disposed in the first region 210D and/or the second region 210E.

The audio module (203, 207, 214) may include the microphone hole 203 and the speaker holes (207, 214). A microphone for obtaining external sound may be disposed inside the microphone hole 203. In any embodiment, a plurality of microphones may be disposed inside the microphone hole 203. The speaker holes (207, 214) may include the external speaker hole 207 and the receiver hole 214 for making a call. In any embodiment, the speaker holes (207, 214) and the microphone hole 203 may be implemented with one hole, or a speaker (e.g., a piezo speaker) may be included without the speaker holes (207, 214).

The sensor module (204, 216, 219) may generate an electrical signal or a data value corresponding to an internal operation state of the mobile electronic device 200 or corresponding to an external environment state. The sensor module (204, 216, 219) may include, for example, the first sensor module 204 (e.g., an illumination sensor or a proximity sensor) and/or a second sensor module (not illustrated) (e.g., a fingerprint sensor) disposed on the first surface 210A of the housing 210, and/or the third sensor module 219 (e.g., a hear rate monitor (HRM) sensor) and/or the fourth sensor module 216 (e.g., a fingerprint sensor) disposed on the second surface 210B of the housing 210. The fingerprint sensor may be positioned on the second surface 210B as well as the first surface 210A (e.g., the display 201) of the housing 210. The mobile electronic device 200 may further include a sensor module not illustrated, for example, at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or the illumination sensor 204.

The camera module (205, 212, 213) may include the first camera device 205 positioned on the first surface 210A of the mobile electronic device 200, and the second camera module 212 and/or the flash 213 positioned on the second surface 210B. The camera module (205, 212, 213) may include one or more lenses, an image sensor, and/or an image signal processor. The flash 213 may include, for example, a light emitting diode or a xenon lamp. In an embodiment, two or more lenses (e.g., an infrared camera and wide-angle and telephoto lenses) and image sensors may be disposed on one surface of the mobile electronic device 200.

The key input devices 217 may be disposed on the side surface 210C of the housing 210. In another embodiment, the mobile electronic device 200 may not include all or a part of the key input devices 217, and the key input device 217 not included may be implemented on the display 201 in the form of a soft key. In an embodiment, a key input device may include the sensor module 216 disposed on the second surface 210B of the housing 210.

The light-emitting device 206 may be disposed, for example, on the first surface 210A of the housing 210. The light-emitting device 206 may provide status information of the mobile electronic device 200, for example, in the form of light. In an embodiment, the light-emitting device 206 may provide, for example, a light source that operates in conjunction with an operation of the camera module (205, 212, 213). The light-emitting device 206 may include, for example, a light-emitting diode (LED), an IR LED, and a xenon lamp.

The connector holes (208, 209) may include the first connector hole 208 that is capable of accommodating a connector (e.g., a USB connector) for transmitting/receiving a power and/or data to/from an external electronic device, and/or the second connector hole (or an earphone jack) 209 that is capable of accommodating a connector for transmitting/receiving an audio signal to/from the external electronic device.

Figure 4:
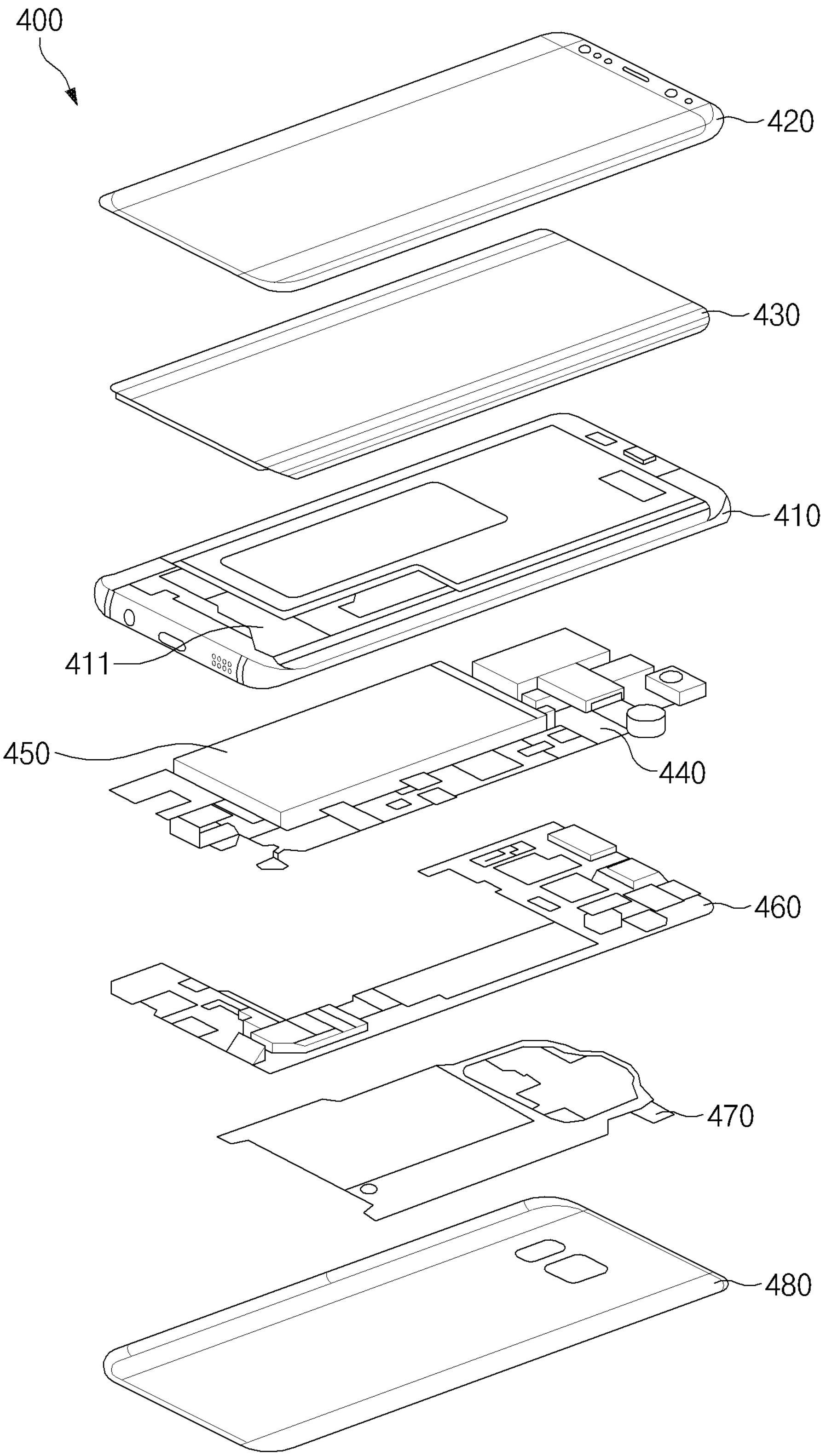
FIG. 4 is an exploded perspective view of a mobile electronic device, according to an embodiment of the disclosure.

FIG. 4 is an exploded perspective view of a mobile electronic device 400, according to an embodiment of the disclosure.

Referring to FIG. 4, the mobile electronic device 400 (e.g., the mobile electronic device 200 of FIG. 2) may include a side bezel structure 410, a first support member 411 (e.g., a bracket), a front plate 420, a display 430, a printed circuit board 440, a battery 450, a second support member 460 (e.g., a rear case), an antenna 470, and a rear plate 480. In any embodiment, the mobile electronic device 400 may not include at least one (e.g., the first support member 411 or the second support member 460) of the components or may further include any component. At least one of the components of the mobile electronic device 400 may be identical or similar to at least one of the components of the mobile electronic device 200 of FIG. 2 or 3, and thus, additional description will be omitted to avoid redundancy.

The first support member 411 may be disposed inside the mobile electronic device 400, and may be connected to the side bezel structure 410 or may be integrally formed with the side bezel structure 410. The first support member 411 may be formed of, for example, a metal material and/or a nonmetal material (e.g., polymer). The display 430 may be coupled with one surface of the first support member 411, and the printed circuit board 440 may be coupled with an opposite surface of the first support member 411. A processor, a memory, and/or an interface may be mounted on the printed circuit board 440. For example, the processor may include one or more of a central processing unit, an application processor, a graphic processing device, an image signal processor, a sensor hub processor, or a communication processor.

Figure 5:
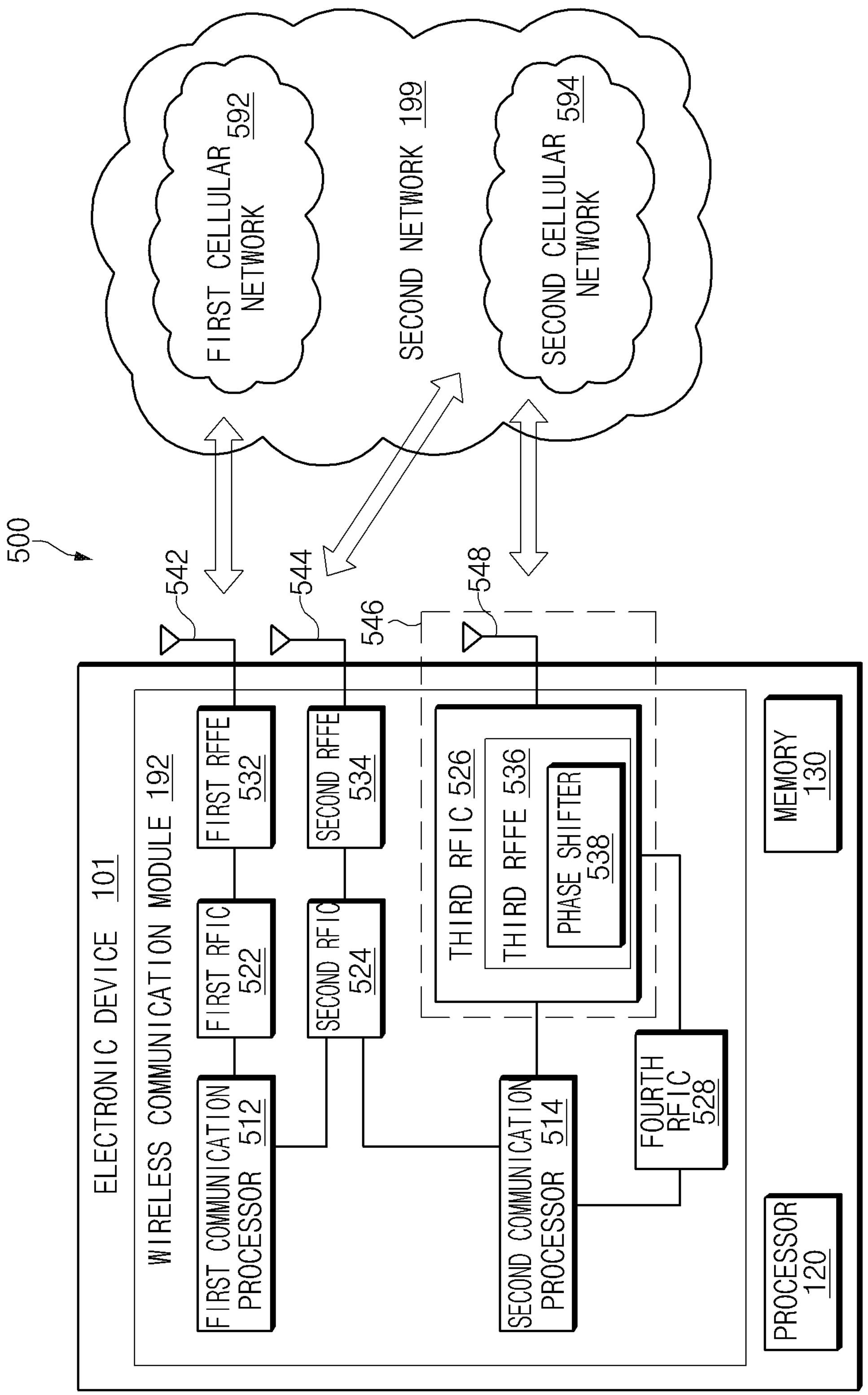
FIG. 5 is a block diagram of an electronic device for supporting legacy network communication and $5^{th}$ generation (5G) network communication, according to an embodiment of the disclosure.

FIG. 5 is a block diagram 500 of the electronic device 101 for supporting legacy network communication and 5G network communication, according to an embodiment of the disclosure.

Referring to FIG. 5, the electronic device 101 may include a first communication processor 512, a second communication processor 514, a first radio frequency integrated circuit (RFIC) 522, a second RFIC 524, a third RFIC 526, a fourth RFIC 528, a first radio frequency front end (RFFE) 532, a second RFFE 534, a first antenna module 542, a second antenna module 544, and an antenna 548. The electronic device 101 may further include the processor 120 and the memory 130. The second network 199 may include a first cellular network 592 and a second cellular network 594. According to another embodiment, the electronic device 101 may further include at least one of the components described in FIG. 1, and the second network 199 may further include at least one other network. According to an embodiment, the first communication processor 512, the second communication processor 514, the first RFIC 522, the second RFIC 524, the fourth RFIC 528, the first RFFE 532, and the second RFFE 534 may form at least part of the wireless communication module 192. According to another embodiment, the fourth RFIC 528 may be omitted or included as the part of the third RFIC 526.

The first communication processor 512 may support the establishment of a communication channel of a band to be used for wireless communication with the first cellular network 592 and the legacy network communication through the established communication channel According to an embodiment, the first cellular network 592 may be a legacy network including $2^{nd}$ generation (2G), $3^{rd}$ generation (3G), $4^{th}$ generation (4G), and/or long term evolution (LTE) network. The second communication processor 514 may support the establishment of a communication channel corresponding to a specified band (e.g., about 6 gigahertz (GHz)~about 60 GHz) among bands to be used for wireless communication with the second cellular network 594 and 5G network communication via the established communication channel According to an embodiment, the second cellular network 594 may be 5G network defined in 3GPP. Additionally, according to an embodiment, the first communication processor 512 or the second communication processor 514 may establish a communication channel for a specified band (e.g., about 6 GHz or lower) of the bands to be used for wireless communication with the second cellular network 594 and may support 5G network communication through the established communication channel. According to an embodiment, the first communication processor 512 and the second communication processor 514 may be implemented within a single chip or a single package. According to an embodiment, the first communication processor 512 or the second communication processor 514 may be implemented within a single chip or a single package with the processor 120, the auxiliary processor 123 of FIG. 1, or the communication module 190 of FIG. 1.

At the time of transmission, the first RFIC 522 may convert a baseband signal generated by the first communication processor 512 to a radio frequency (RF) signal of about 700 megahertz (MHz) to about 3 GHz used for the first cellular network 592 (e.g., a legacy network). At the time of reception, the RF signal may be obtained from the first cellular network 592 (e.g., a legacy network) via an antenna (e.g., the first antenna module 542) and may be preprocessed via RFFE (e.g., the first RFFE 532). The first RFIC 522 may convert the pre-processed RF signal into a baseband signal so as to be processed by the first communication processor 512.

In the case of transmitting a signal, the second RFIC 524 may convert a baseband signal generated by the first communication processor 512 or the second communication processor 514 into an RF signal (hereinafter referred to as a "5G Sub6 RF signal") in a Sub6 band (e.g., about 6 GHz or lower) used in the second cellular network 594 (e.g., a 5G network). At the time of reception, the 5G Sub6 RF signal may be obtained from the second cellular network 594 (e.g., 5G network) via an antenna (e.g., the second antenna module 544) and may be preprocessed via RFFE (e.g., the second RFFE 534). The second RFIC 524 may convert the pre-processed 5G Sub6 RF signal into a baseband signal so as to be processed by a communication processor corresponding to the 5G Sub6 RF signal from among the first communication processor 512 or the second communication processor 514.

The third RFIC 526 may convert a baseband signal generated by the second communication processor 514 into an RF signal (hereinafter referred to as a "5G Above6 RF signal") in a 5G Above6 band (e.g., approximately 6 GHz to approximately 60 GHz) to be used in the second cellular network 594 (e.g., a 5G network). In the case of receiving a signal, the 5G Above6 RF signal may be obtained from the second cellular network 594 (e.g., a 5G network) through an antenna (e.g., the antenna 548) and may be pre-processed through a third RFFE 536. For example, the third RFFE 536 may perform preprocessing of a signal, using a phase shifter 538. The third RFIC 526 may convert the preprocessed 5G Above6 RF signal to a baseband signal so as to be processed by the second communication processor 514. According to an embodiment, the third RFFE 536 may be implemented as a part of the third RFIC 526.

According to an embodiment, the electronic device 101 may include the fourth RFIC 528 independent of the third RFIC 526 or as at least part thereof. In this case, the fourth RFIC 528 may convert the baseband signal generated by the second communication processor 514, to an RF signal (hereinafter referred to as an intermediate frequency (IF) signal) of an intermediate frequency band (e.g., about 9 GHz~about 11 GHz) and then may transmit the IF signal to the third RFIC 526. The third RFIC 526 may convert the IF signal to the 5G Above6 RF signal. In the case of receiving a signal, the 5G Above6 RF signal may be received from the second cellular network 594 (e.g., a 5G network) through an antenna (e.g., the antenna 548) and may be converted into an IF signal by the third RFIC 526. The fourth RFIC 528 may convert the IF signal into a baseband signal so as to be processed by the second communication processor 514.

According to an embodiment, the first RFIC 522 and the second RFIC 524 may be implemented with a part of a single chip or a single package. According to an embodiment, the first RFFE 532 and the second RFFE 534 may be implemented with a part of a single chip or a single package. According to an embodiment, at least one of the first antenna module 542 or the second antenna module 544 may be omitted or may be combined with any other antenna module to process RF signals in a plurality of bands.

According to an embodiment, the third RFIC 526 and the antenna 548 may be disposed at the same substrate to form a third antenna module 546. For example, the wireless communication module 192 or the processor 120 may be disposed on a first substrate (e.g., a main PCB). In this case, the third RFIC 526 may be disposed in a partial region (e.g., on a lower surface) of a second substrate (e.g., a sub PCB) independent of the first substrate, and the antenna 548 may be disposed in another partial region (e.g., on an upper surface) of the second substrate. As such, the third antenna module 546 may be formed. According to an embodiment, for example, the antenna 548 may include an antenna array capable of being used for beamforming. It is possible to reduce the length of the transmission line between the third RFIC 526 and the antenna 548 by positioning the third RFIC 526 and the antenna 548 on the same substrate. The decrease in the transmission line may make it possible to reduce the loss (or attenuation) of a signal in a high-frequency band (e.g., approximately 6 GHz to approximately 60 GHz) used for the 5G network communication due to the transmission line. For this reason, the electronic device 101 may improve the quality or speed of communication with the second cellular network 594 (e.g., 5G network).

The second cellular network 594 (e.g., a 5G network) may be used independently of the first cellular network 592 (e.g., a legacy network) (e.g., stand-alone (SA)) or may be used in conjunction with the first cellular network 592 (e.g., non-stand alone (NSA)). For example, only an access network (e.g., a 5G radio access network (RAN) or a next generation RAN (NG RAN)) may be in the 5G network, and a core network (e.g., a next generation core (NGC)) may be absent from the 5G network. In this case, the electronic device 101 may access the access network of the 5G network and may then access an external network (e.g., Internet) under control of the core network (e.g., an evolved packed core (EPC)) of the legacy network. Protocol information (e.g., LTE protocol information) for communication with the legacy network or protocol information (e.g., New Radio NR protocol information) for communication with the 5G network may be stored in the memory 130 and may be accessed by another component (e.g., the processor 120, the first communication processor 512, or the second communication processor 514).

Figure 6:
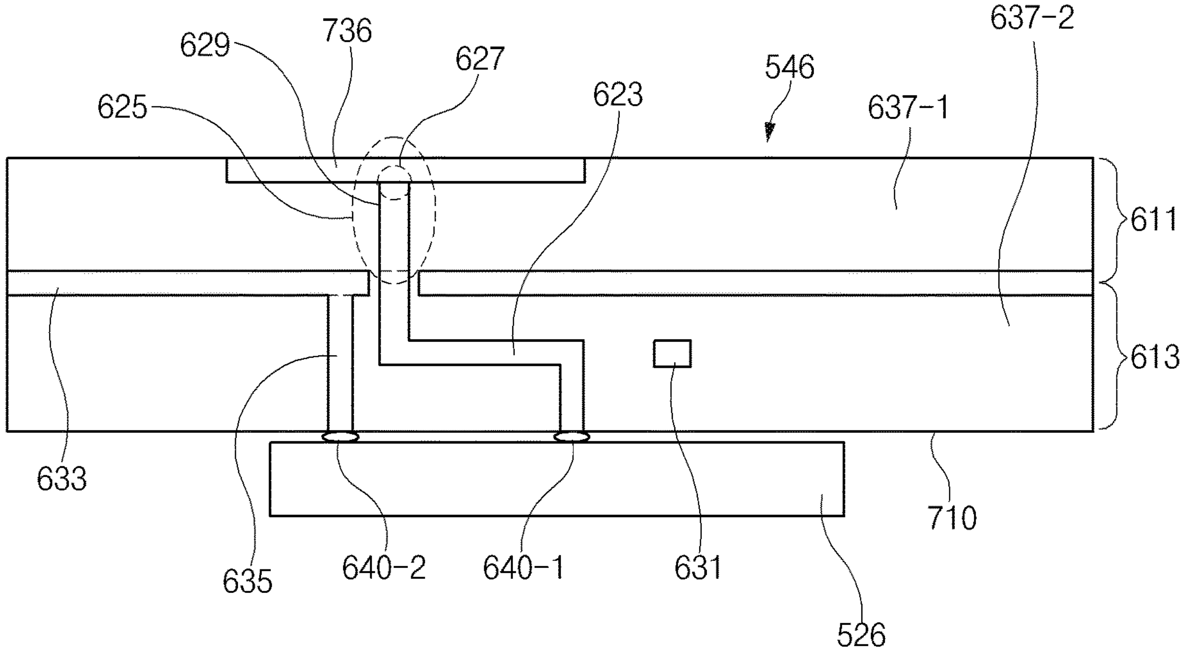
FIG. 6 illustrates a cross-sectional view of a third antenna module taken along a line B-B' of FIG. 7 according to an embodiment of the disclosure.
Figure 7:
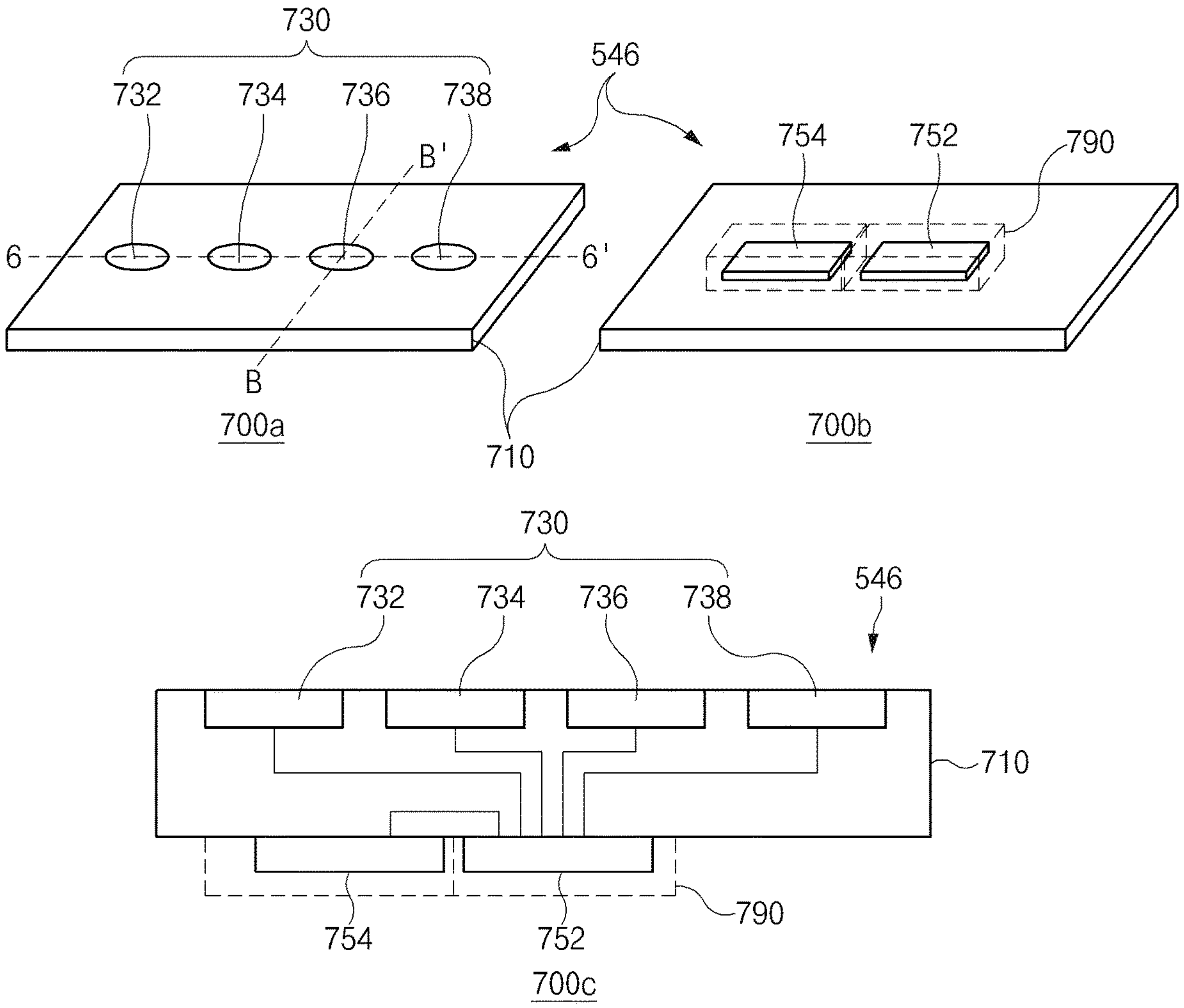
FIG. 7 illustrates a structure of a third antenna module of FIG. 5 according to an embodiment of the disclosure.

FIG. 6 illustrates a cross-sectional view of the third antenna module 546 taken along the line B-B' of 700*a* in FIG. 7 according to an embodiment of the disclosure. In an embodiment illustrated, a printed circuit board 710 may include an antenna layer 611 and a network layer 613.

The antenna layer 611 may include at least one dielectric layer 637-1, and an antenna element 736 and/or a feed part 625 formed on an outer surface of the dielectric layer 637-1 or therein. The feed part 625 may include a feed point 627 and/or a signal line 629.

The network layer 613 may include at least one dielectric layer 637-2 and at least one ground layer 633, at least one conductive via 635, a transmission line 623, and/or a signal line 629 formed on an outer surface of the dielectric layer 637-2 or therein.

In addition, in the embodiment illustrated, the third RFIC 526 may be electrically connected to the network layer 613, for example, through first and second solder bumps 640-1 and 640-2. In an embodiment, various connection structures (e.g., soldering or a ball grid array (BGA)) may be utilized instead of the solder bumps. The third RFIC 526 may be electrically connected with the antenna element 736 through the first connection part 640-1, the transmission line 623, and the feed part 625. Also, the third RFIC 526 may be electrically connected with the ground layer 633 through the second connection part 640-2 and the conductive via 635. Although not illustrated, the third RFIC 526 may also be electrically connected with the above module interface through the signal line 629.

FIG. 7 illustrates the third antenna module 546 described with reference to FIG. 5, according to an embodiment of the disclosure. In FIG. 7, 700*a* is a perspective view of the third antenna module 546 when viewed from one side, 700*b* is a perspective view of the third antenna module 546 when viewed from another side, and 700*c* is a cross-sectional view of the third antenna module 546 taken along a line 6-6'.

Referring to FIG. 7, in an embodiment, the third antenna module 546 may include the printed circuit board 710, an antenna array 730, a radio frequency integrated circuit (RFIC) 752, a power manage integrated circuit (PMIC) 754, and a module interface (not illustrated). Selectively, the third antenna module 546 may further include a shielding member 790. In an embodiment, at least one of the above components may be omitted, or at least two of the components may be integrally formed.

The printed circuit board 710 may include a plurality of conductive layers and a plurality of non-conductive layers, and the conductive layers and the non-conductive layers may be alternately stacked. The printed circuit board 710 may provide electrical connection with various electronic components disposed on the printed circuit board 710 or on the outside, using wires and conductive vias formed in the conductive layers.

The antenna array 730 (e.g., 548 of FIG. 5) may include a plurality of antenna elements 732, 734, 736, and 738 disposed to form a directional beam. As illustrated in drawings, the antenna elements may be formed on a first surface of the printed circuit board 710 as illustrated. According to another embodiment, the antenna array 730 may be formed within the printed circuit board 710. According to embodiments, the antenna array 730 may include a plurality of antenna arrays (e.g., a dipole antenna array and/or a patch antenna array), the shapes or kinds of which are identical or different.

The RFIC 752 (e.g., the third RFIC 526 of FIG. 5) may be disposed on another region (e.g., a second surface facing away from the first surface) of the printed circuit board 710 so as to be spaced from the antenna array 730. The RFIC 752 may be configured to process a signal in the selected frequency band, which is transmitted/received through the antenna array 730. According to an embodiment, in the case of transmitting a signal, the RFIC 752 may convert a baseband signal obtained from a communication processor (not illustrated) into an RF signal. In the case of receiving a signal, the RFIC 752 may convert an RF signal received through the antenna array 730 into a baseband signal and may provide the baseband signal to the communication processor.

According to another embodiment, in the case of transmitting a signal, the RFIC 752 may up-convert an IF signal (e.g., approximately 9 GHz to approximately 11 GHz) obtained from an intermediate frequency integrated circuit (IFIC) (e.g., the fourth RFIC 528 of FIG. 5) into an RF signal. In the case of receiving a signal, the RFIC 752 may down-convert an RF signal obtained through the antenna array 730 into an IF signal and may provide the IF signal to the IFIC.

The PMIC 754 may be disposed on another region (e.g., the second surface) of the printed circuit board 710, which is spaced from the antenna array. The PMIC 754 may be supplied with a voltage from a main PCB (not illustrated)

and may provide a power necessary for various components (e.g., the RFIC 752) on an antenna module.

The shielding member 790 may be disposed at a portion (e.g., on the second surface) of the printed circuit board 710 such that at least one of the RFIC 752 or the PMIC 754 is electromagnetically shielded. According to an embodiment, the shielding member 790 may include a shield can.

Although not illustrated in drawings, in an embodiment, the third antenna module 546 may be electrically connected with another printed circuit board (e.g., a main circuit board) through a module interface. The module interface may include a connection member, for example, a coaxial cable connector, a board to board connector, an interposer, or a flexible printed circuit board (FPCB). The RFIC 752 and/or the PMIC 754 of the third antenna module 546 may be electrically connected with the printed circuit board through the connection member.

Figure 8:
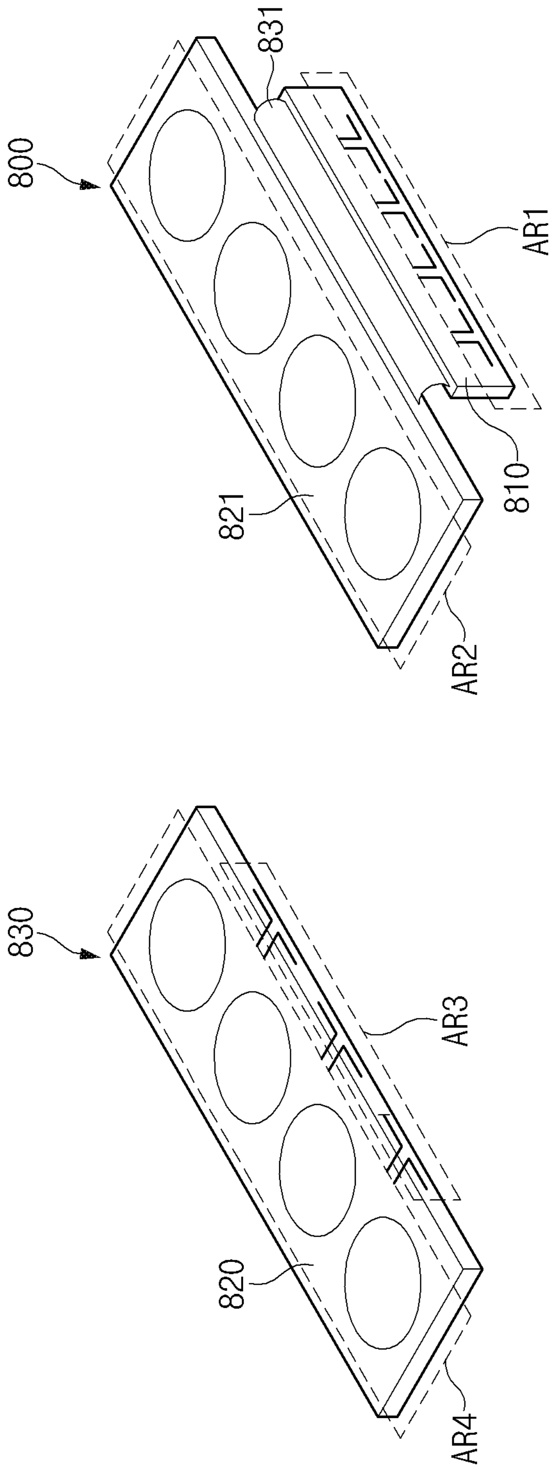
FIG. 8 is a perspective view of antenna modules according to an embodiment of the disclosure.

FIG. 8 is a perspective view of antenna modules according to an embodiment of the disclosure.

According to an embodiment, a first antenna module 800 (e.g., the third antenna module 546 in FIG. 5) may include a first antenna array AR1 (e.g., the antenna array 730 in FIG. 7) and a second antenna array AR2. According to an embodiment, the first antenna module 800 may include a (1-1)-th printed circuit board 810 and a (1-2)-th printed circuit board 821. For example, the (1-1)-th printed circuit board 810 and the (1-2)-th printed circuit board 821 may be electrically and physically connected through a connecting member 831. For example, the connecting member 831 may be a flexible printed circuit board (FPCB) including at least one layer. According to an embodiment, the first antenna array AR1 may be positioned within and/or on the (1-1)-th printed circuit board 810, and the second antenna array AR2 may be positioned within and/or on the (1-2)-th printed circuit board 821.

According to an embodiment, the first antenna array AR1 may include a plurality of conductive patterns. For example, the first antenna array AR1 may include a plurality of dipole antenna elements. For another example, the first antenna array AR1 may include a plurality of dipole antenna elements and a plurality of shorted-patch (s-patch) antenna elements. The first antenna array AR1 may be electrically connected to the RFIC (e.g., the RFIC 752 of FIG. 7) included in the first antenna module 800. For example, the RFIC may transmit and receive signals, using the first antenna array AR1. The shape of the first antenna array AR1 illustrated in FIG. 8 is an embodiment of the disclosure are not limited thereto.

According to an embodiment, the second antenna array AR2 may include a plurality of conductive patterns. For example, the second antenna array AR2 may include a plurality of patch-type antenna elements. The second antenna array AR2 may be electrically connected to the RFIC (e.g., the RFIC 752 of FIG. 7) included in the first antenna module 800. For example, the RFIC may transmit and receive signals, using the second antenna array AR2. The shape of the second antenna array AR2 illustrated in FIG. 8 is an embodiment of the disclosure are not limited thereto. For example, the second antenna array AR2 may include rectangular patch-type antenna elements.

According to an embodiment, a second antenna module 830 (e.g., the third antenna module 546 in FIG. 5) may include a third antenna array AR3 and a fourth antenna array AR4. According to an embodiment, the second antenna module 830 may include a second printed circuit board 820. For example, the second printed circuit board 820 may include a plurality of conductive vias for electrically connecting the third antenna array AR3 and the fourth antenna array AR4 to the RFIC (e.g., the RFIC 752 of FIG. 7). According to an embodiment, the third antenna array AR3 and the fourth antenna array AR4 may be positioned within and/or on the second printed circuit board 820.

According to an embodiment, the third antenna array AR3 may include a plurality of conductive patterns. For example, the third antenna array AR3 may include a plurality of dipole antenna elements and a plurality of s-patch antenna elements. The third antenna array AR3 may be electrically connected to the RFIC (e.g., the RFIC of FIG. 7) included in the second antenna module 830. For example, the RFIC may transmit and receive signals, using the third antenna array AR3. The shape of the third antenna array AR3 illustrated in FIG. 8 is an embodiment of the disclosure are not limited thereto.

According to an embodiment, the fourth antenna array AR4 may include a plurality of conductive patterns. For example, the fourth antenna array AR4 may include a plurality of patch-type antenna elements. The fourth antenna array AR4 may be electrically connected to the RFIC (e.g., the RFIC 752 of FIG. 7) included in the second antenna module 830. For example, the RFIC may transmit and receive signals, using the fourth antenna array AR4. The shape of the fourth antenna array AR4 illustrated in FIG. 8 is an embodiment of the disclosure are not limited thereto. For example, the fourth antenna array AR4 may include rectangular patch-type antenna elements.

Figure 9:
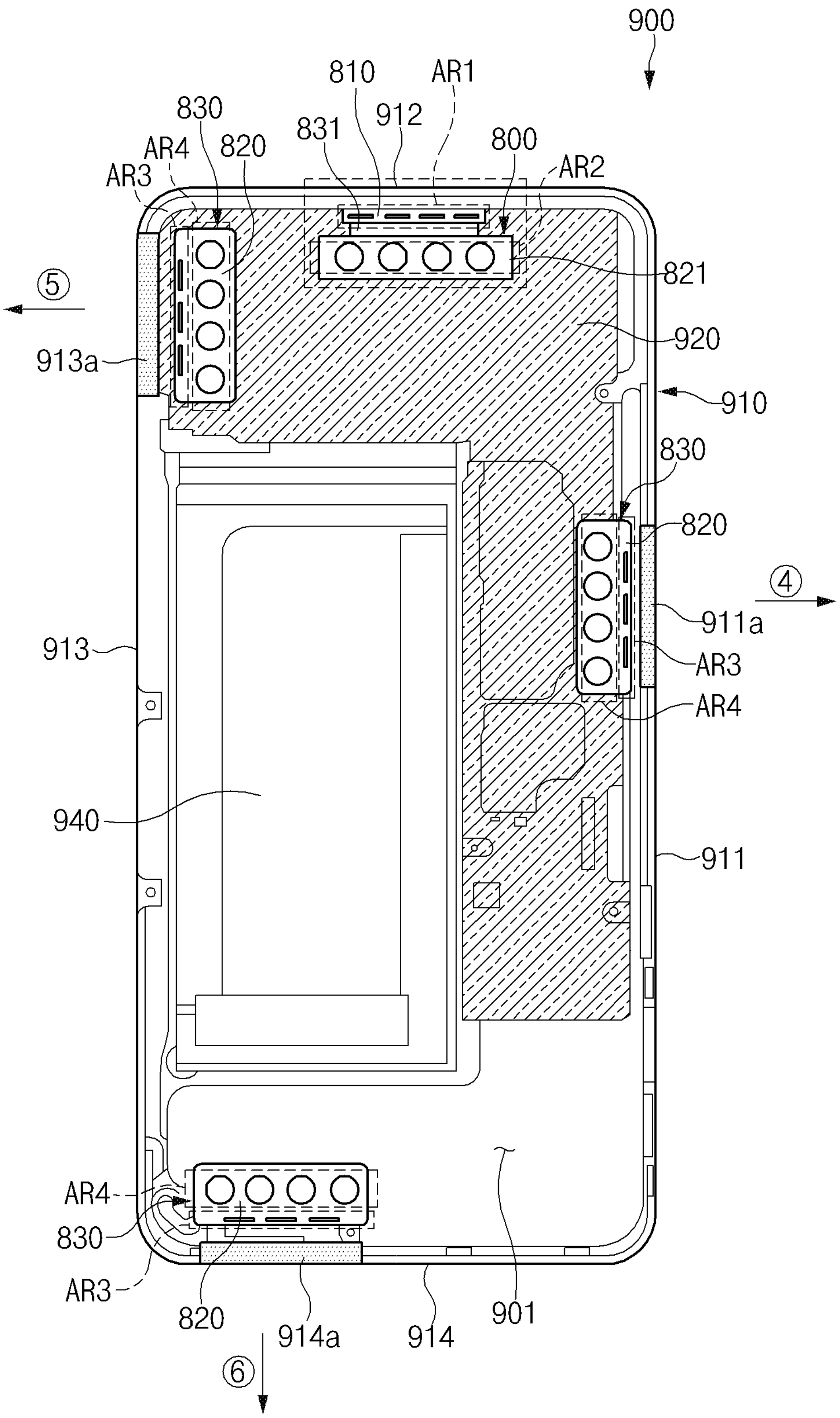
FIG. 9 is a view illustrating an arrangement relationship in which antenna modules are arranged in an electronic device, according to an embodiment of the disclosure.

FIG. 9 is a view illustrating an arrangement relationship in which the antenna modules 800 and 830 are arranged in an electronic device 900, according to an embodiment of the disclosure.

Referring to FIG. 9, the electronic device 900 (e.g., the mobile electronic device 200 of FIG. 2) may include a side member 910 (e.g., the side member 210 of FIG. 2). According to an embodiment, the side member 910 may include a first side surface 911 formed with a first length, a second side surface 912 extending in a direction perpendicular to the first side surface 911 and having a second length shorter than the first length, a third side surface 913 extending in a direction parallel to the first side surface 911 from the second side surface 912 and having the first length, and a fourth side surface 914 extending in a direction parallel to the second side surface 912 from the third side surface 913 and having the second length. According to an embodiment, the electronic device 900 may include a battery 940 and a device substrate 920, which is disposed in the method of avoiding or at least partially overlapping with the battery 940, in an inner space 901. According to an embodiment, the first antenna module 800 and the second antenna modules 830 may be arranged in various directions in the inner space 901 and may be electrically connected to the device substrate 920.

According to an embodiment, the first antenna module 800 may be disposed at the periphery of the second side surface 912. According to an embodiment, for example, the plurality of second antenna modules 830 may be arranged at the periphery of the first side surface 911, at the periphery of the third side surface 913, and/or at the periphery of the fourth side surface 914. According to an embodiment, the third antenna array AR3 of the second antenna module 830 disposed at the periphery of the first side surface 911 may form a beam pattern in a direction (direction), in which the first side surface 911 faces, through a first non-conductive region 911*a* partially formed on the first side surface 911, and the fourth antenna array AR4 may form a beam pattern in a direction in which the rear plate (e.g., the rear plate 211 of FIG. 3) of the electronic device 900 faces. According to an embodiment, the third antenna array AR3 of the second antenna module 830 disposed at the periphery of the third side surface 913 may form a beam pattern in a direction (® direction), in which the third side surface 913 faces, through a second non-conductive region 913*a* partially formed on the third side surface 913, and the fourth antenna array AR4 may form a beam pattern in a direction in which the rear plate (e.g., the rear plate 211 of FIG. 3) of the electronic device 900 faces. According to an embodiment, the third antenna array AR3 of the second antenna module 830 disposed at the periphery of the fourth side surface 914 may form a beam pattern in a direction (® direction), in which the fourth side surface 914 faces, through a third non-conductive region 914*a* partially formed on the fourth side surface 914, and the fourth antenna array AR4 may form a beam pattern in a direction in which the rear plate (e.g., the rear plate 211 of FIG. 3) of the electronic device 900 faces.

According to an embodiment, unlike the second antenna module 830, the first antenna array AR1 of the first antenna module 800 disposed at the periphery of the second side surface 912 may be configured to form a beam pattern in a direction in which a front plate (e.g., the front plate 202 of FIG. 2) of the electronic device (e.g., the mobile electronic device 200 of FIG. 2) faces, and the second antenna array AR2 may form a beam pattern in a direction in which the rear plate (e.g., the rear plate 211 of FIG. 3) of the electronic device 900 faces. In this case, the beam coverage in a direction in which the front plate faces may be achieved by using the first antenna array AR1.

Figure 10:
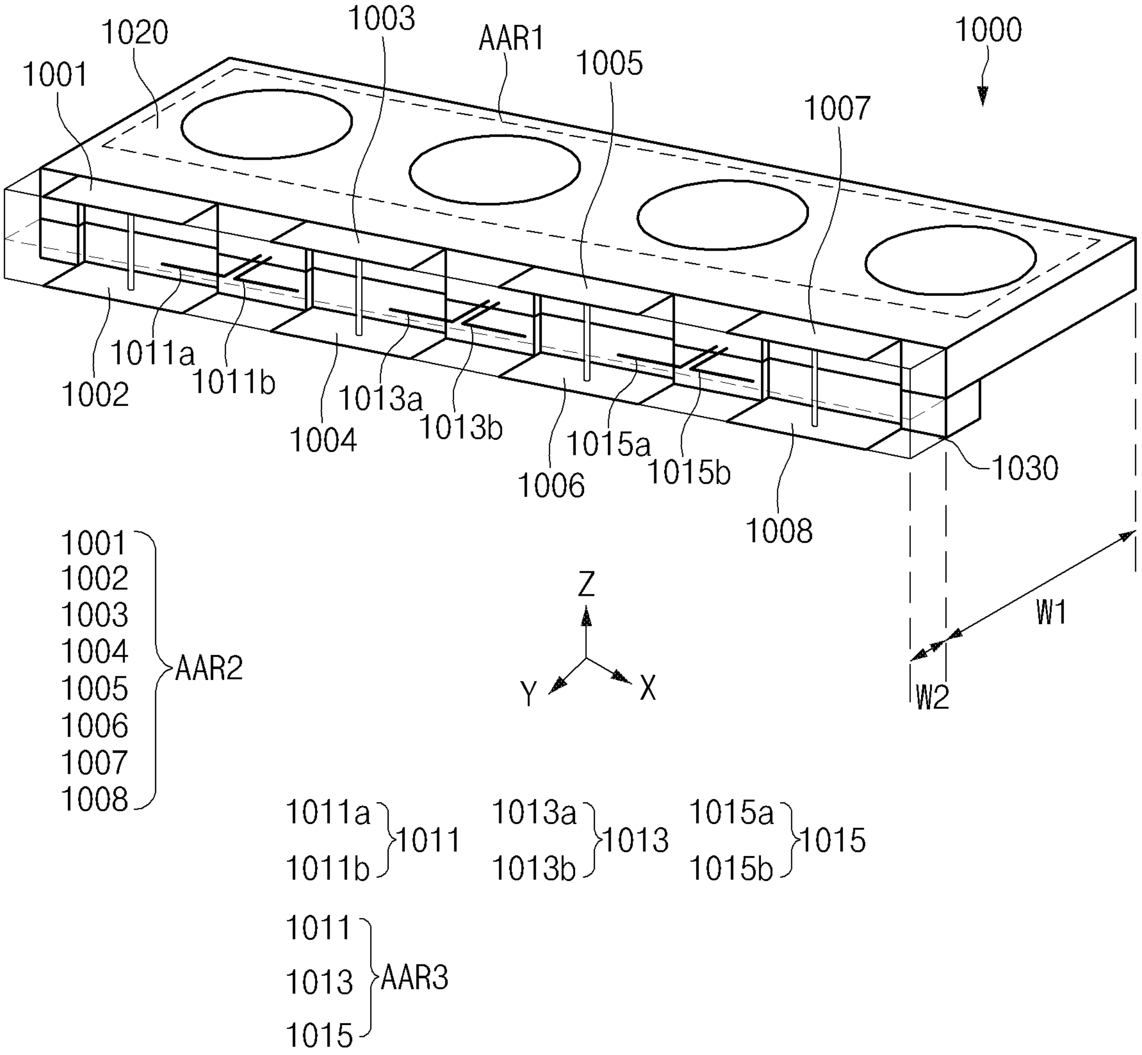
FIG. 10 is a perspective view of an antenna module according to an embodiment of the disclosure.

FIG. 10 is a perspective view of an antenna module 1000 according to an embodiment of the disclosure.

According to an embodiment, the antenna module 1000 (e.g., the second antenna module 830 of FIG. 8) may be positioned inside the housing of the electronic device (e.g., the mobile electronic device 200 of FIG. 2). Referring back to FIGS. 2 and 3, the housing may include a first plate (e.g., the first surface 210A), a second plate (e.g., the second surface 210B) facing away from the first plate, and a side member (e.g., the side surface 210C) surrounding a space between the first plate and the second plate and coupled with the second plate or integrally formed with the second plate. For example, the display (e.g., the display device 160 of FIG. 1) may be viewable through at least part of the first plate.

According to an embodiment, the antenna module 1000 may include an antenna structure and a wireless communication circuit. For example, the antenna structure may be referred to as the remaining components of the antenna module 1000 other than the wireless communication circuit (e.g., the RFIC 526 of FIG. 6). For example, the wireless communication circuit may be electrically connected to radiation patterns (e.g., antenna elements) of the antenna module 1000 and configured to transmit and/or receive a signal having a frequency between 3 GHz and 100 GHz.

According to an embodiment, the antenna module 1000 may include a first printed circuit board 1020 and a second printed circuit board 1030. The first printed circuit board 1020 may include a first surface facing the first direction (e.g., +z direction) and a second surface facing the second direction (e.g., −z direction). For example, the second printed circuit board 1030 may be coupled to at least part of the second surface of the first printed circuit board 1020. For another example, the first printed circuit board 1020 and the second printed circuit board 1030 may be generated by removing a part of at least some layers of one printed circuit board. According to an embodiment, the second printed circuit board 1030 may be located on a second surface of the first printed circuit board 1020 other than a region where an RFIC (not illustrated) is located. For example, the second printed circuit board 1030 may be located in at least part of the remaining regions other than a region, where the RFIC and a shield can (e.g., the shield member 790 of FIG. 7) are positioned, on the second surface of the first printed circuit board 1020.

According to an embodiment, the antenna module 1000 may include a region W1 and a region W2. For example, the periphery of the region W1 (e.g., the boundary between the region W1 and the region W2) may extend along the X axis.

According to an embodiment, the antenna module 1000 may include a second antenna array AAR2 (e.g., the third antenna array AR3 of FIG. 8) including a plurality of s-patch elements. For example, the second antenna array AAR2 may include at least part of the first conductive layer and at least part of the second conductive layer. The second antenna array AAR2 may include a first region 1001, a second region 1002, a third region 1003, a fourth region 1004, a fifth region 1005, a sixth region 1006, a seventh region 1007, and/or an eighth region 1008. For example, in the second antenna array AAR2, a main beam may be formed in the +Y direction, and polarization may be formed in the Z-axis direction. The second antenna array AAR2 may include four s-patch elements arranged in a row. The second antenna array AAR2 may be located on one side surface (e.g., a surface facing the +Y direction) of the antenna module 1000 to perform vertical polarization.

For example, the first conductive layer may include the first region 1001, the third region 1003, the fifth region 1005, and/or the seventh region 1007. The first region 1001, the third region 1003, the fifth region 1005, and/or the seventh region 1007 are spaced by a first distance on the first periphery and may be extended in the +Y axis direction from the first periphery. The first periphery may correspond to the boundary between the region W1 and the region W2 of the first printed circuit board 1020. For example, the second region 1002, the fourth region 1004, the sixth region 1006, and/or the eighth region 1008 on the second conductive layer may be spaced by a second distance on the second periphery and may be extended in the +Y axis direction from the second periphery. The second periphery may correspond to the boundary between the region W1 and the region W2 of the second printed circuit board 1030. For example, the first distance and the second distance may be substantially the same as each other.

According to an embodiment, the second antenna array AAR2 may include a plurality of s-patch antenna elements. For example, the second antenna array AAR2 may include a first s-patch element (e.g., the first region 1001 and the second region 1002), a second s-patch element (e.g., the third region 1003 and the fourth region 1004), a third s-patch element (e.g., the fifth region 1005 and the sixth region 1006), and a fourth s-patch element (e.g., the seventh region 1007 and the eighth region 1008). For example, the first s-patch element may include the first region 1001 and the second region 1002 extending in a +Y direction from the first portion of the periphery. The second region 1002 may be spaced from the first region 1001 to face the first region 1001. The second s-patch element may include the third region 1003 and the fourth region 1004 that extend in the +Y direction from a second portion of the periphery spaced by the first distance from the first portion. The fourth region 1004 may be spaced from the third region 1003 to face the third region 1003. The third s-patch element may include the fifth region 1005 and the sixth region 1006 that extend in the +Y direction from the third portion of the periphery spaced from the second portion by the first distance. The sixth region 1006 may be spaced from the fifth region 1005 to face the fifth region 1005. The fourth s-patch element may include the seventh region 1007 and the eighth region 1008 that extend in the +Y direction from a fourth portion of the periphery spaced by the first distance from the third portion. The eighth region 1008 may be spaced from the seventh region 1007 to face the seventh region 1007.

According to an embodiment, each s-patch element of the second antenna array AAR2 may be connected to one feed path and ground. For example, the second region 1002 of the first s-patch element (e.g., the first region 1001 and the second region 1002) may be electrically connected to the feed path, and the first region 1001 may be electrically connected to the ground region. Similarly, the fourth region 1004, the sixth region 1006, and the eighth region 1008 may be electrically connected to the feed path, and the third region 1003, the fifth region 1005, and the seventh region 1007 may be electrically connected to the ground region.

According to an embodiment, the antenna module 1000 may include a third antenna array AAR3 in the region W2. The third antenna array AAR3 may include a plurality of dipole antenna elements. For example, the third antenna array AAR3 may include a first dipole antenna 1011, a second dipole antenna 1013, and/or a third dipole antenna 1015. Each of the dipole antennas of the third antenna array AAR3 may be configured to form a main beam in the +Y direction, and the third antenna array AAR3 may be configured to perform horizontal polarization using dipole antennas. The first dipole antenna 1011 may include a conductive pattern 1011*a* and a conductive pattern 1011*b*, and may be positioned between a first portion where the first s-patch element is positioned and a second portion where the second s-patch element is positioned. The second dipole antenna 1013 may include a conductive pattern 1013*a* and a conductive pattern 1013*b*, and may be positioned between a second portion where the second s-patch element is positioned and a third portion where the third s-patch element is positioned. The third dipole antenna 1015 may include a conductive pattern 1015*a* and a conductive pattern 1015*b*, and may be positioned between a third portion where the third s-patch element is positioned and a fourth portion where the fourth s-patch element is positioned.

According to an embodiment, one of the two conductive patterns of the dipole antenna may be electrically connected to a feed part, and the other may be electrically connected to a ground part. For example, one of the conductive patterns 1011*a* and 1011*b* of the first dipole antenna 1011 may be electrically connected to the feed part, and the other may be electrically connected to the ground part. For example, one of the conductive patterns 1013*a* and 1013*b* of the second dipole antenna 1013 may be electrically connected to the feed part, and the other may be electrically connected to the ground part. For example, one of the conductive patterns 1015*a* and 1015*b* of the third dipole antenna 1015 may be electrically connected to the feed part, and the other may be electrically connected to the ground part.

According to an embodiment, the two conductive patterns of the dipole antenna may be electrically connected to feed parts. For example, one of the conductive patterns 1011*a* and 1011*b* of the first dipole antenna 1011 may be electrically connected to the feed part of the first polarity, and the other may be electrically connected to the feed part of the second polarity. For example, one of the conductive patterns 1013*a* and 1013*b* of the second dipole antenna 1013 may be electrically connected to the feed part of the first polarity, and the other may be electrically connected to the feed part of the second polarity. For example, one of the conductive patterns 1015*a* and 1015*b* of the third dipole antenna 1015 may be electrically connected to the feed part of the first polarity, and the other may be electrically connected to the feed part of the second polarity. In this case, the first polarity and the second polarity may have a phase difference of 180 degrees.

According to an embodiment, the second dipole antenna 1013 may be fed with two signals having different polarities. For example, the second dipole antenna 1013 may be an antenna element with differential feed. According to an embodiment, the first dipole antenna 1011 and the third dipole antenna 1015 may be the antenna element having a single feed. For example, the first dipole antenna 1011 may be connected to a feed path and a ground path. For example, the third dipole antenna 1015 may be connected to a feed path and a ground path. In an embodiment, when the total of four feed lines are provided to the third antenna array AAR3, the conductive pattern 1011*b*, the conductive pattern 1013*a*, the conductive pattern 1013*b*, and the conductive pattern 1015*b* may be connected to the feed line. The differential feed may be provided to only the second dipole antenna 1013, and the feed may be provided to only one of the conductive patterns in each of the remaining two dipole antennas 1011 and 1015.

According to an embodiment, a first antenna array AAR1 (e.g., the fourth antenna array AR4 of FIG. 8) may include a plurality of patch antenna elements. For example, a plurality of patch antenna elements (e.g., 4) are arranged in a row, and the plurality of patch antenna elements may be configured to form a main beam in the +Z direction. For example, two feed lines may be connected to each of a plurality of patch antenna elements of the first antenna array AAR1. The two feed lines for vertical polarization and horizontal polarization may be electrically connected to each of the plurality of patch antenna elements of the first antenna array AAR1. For another example, the two feed lines for vertical polarization and horizontal polarization may be coupled to each of a plurality of patch antenna elements of the first antenna array AAR1.

Figure 11:
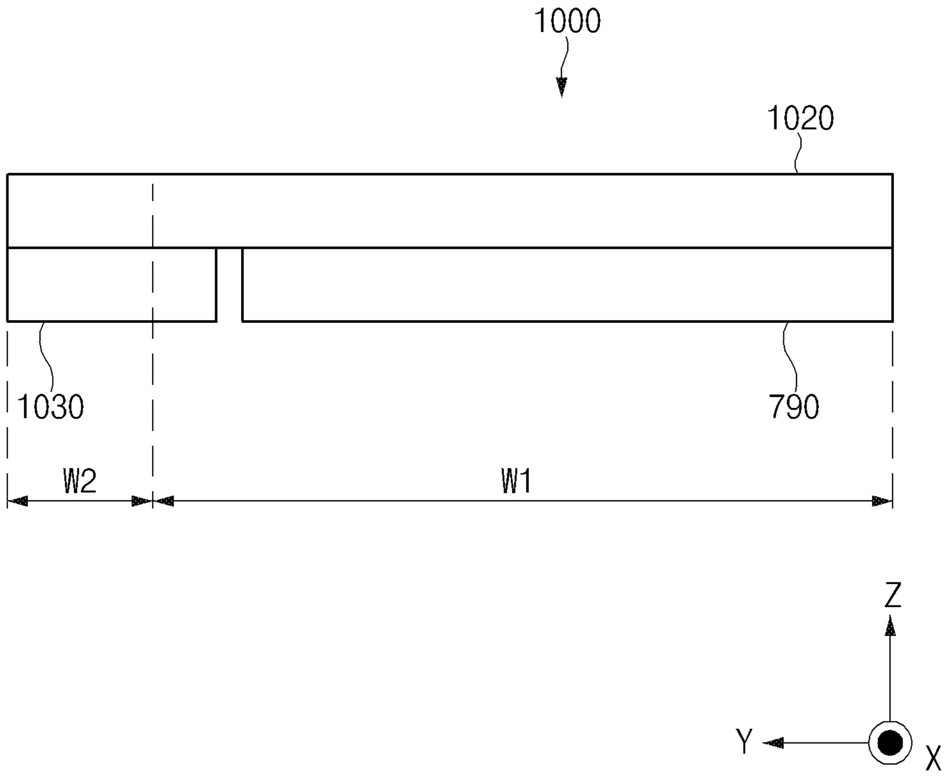
FIG. 11 is a side view of an antenna module according to an embodiment of the disclosure.

FIG. 11 is a side view of the antenna module 1000 according to an embodiment of the disclosure.

Referring to FIG. 11, a side view of the antenna module 1000 viewed in the −X direction from one side surface of the antenna module 1000 of FIG. 10 is illustrated. When viewed from one side surface, the second printed circuit board 1030 may be positioned on one surface of the first printed circuit board 1020 so as not to overlap with the shielding member 790. Because the second printed circuit board 1030 does not overlap with the shielding member 790, the increase in the thickness of the antenna module 1000 due to the addition of the second printed circuit board 1030 may be minimized despite the addition of the second printed circuit board 1030.

Figure 12:
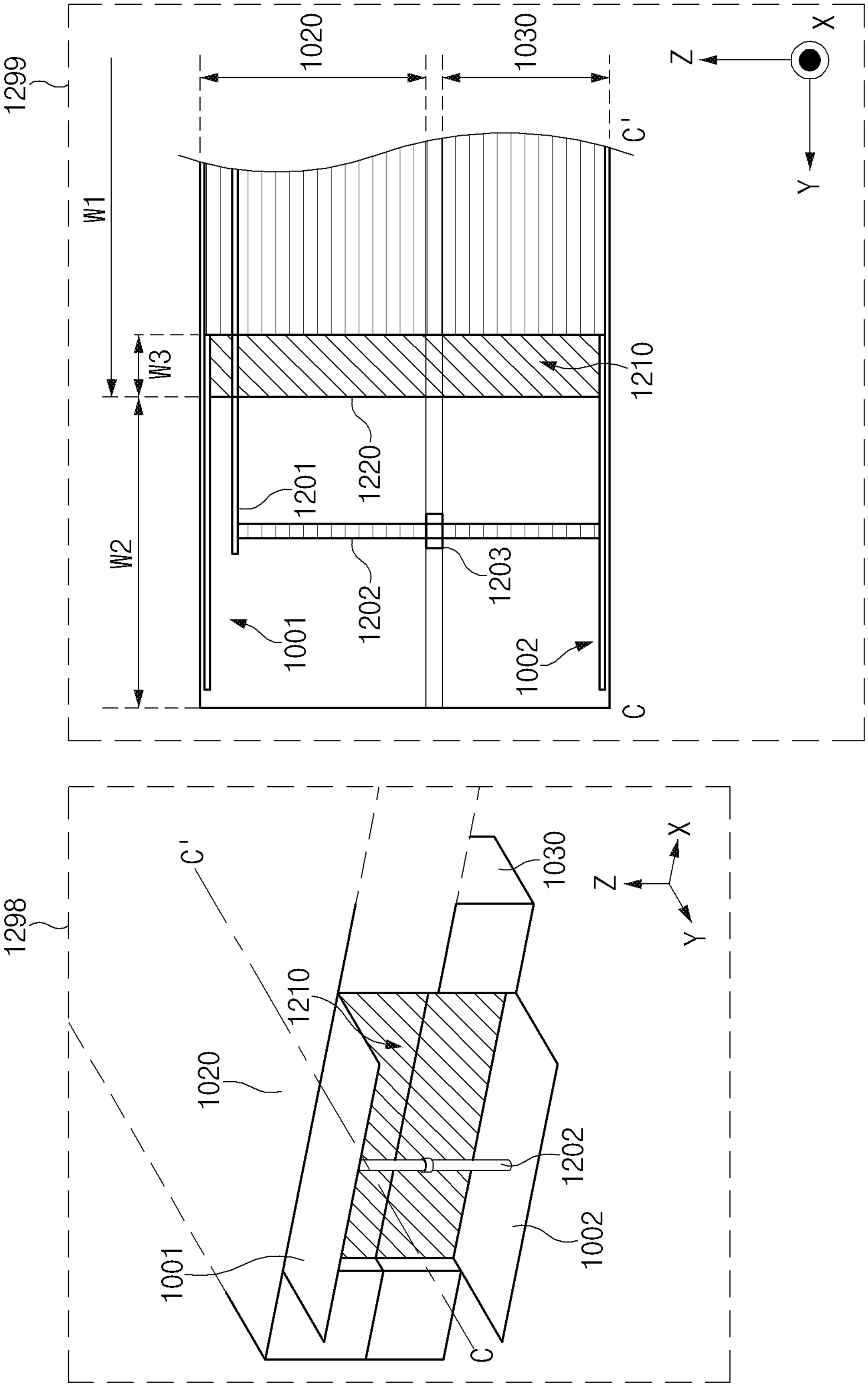
FIG. 12 illustrates an s-patch structure according to an embodiment of the disclosure.

FIG. 12 illustrates an s-patch structure according to an embodiment of the disclosure.

Hereinafter, the structure of the s-patch element may be described with reference to FIG. 12. Referring to FIG. 12, the structure of the first s-patch element of FIG. 11 may be described. However, a similar description may be applied to the second, third, and fourth s-patch elements.

Referring to reference number 1298, the s-patch element may include the first region 1001 extending and protruding from the first periphery of the first printed circuit board 1020 in the +Y direction, and the second region 1002 extending and protruding from the second periphery of the second printed circuit board 1030 in the +Y direction. For example, when the antenna module is viewed from above the top, the s-patch element may include conductive paths 1201 and 1202 positioned in regions overlapping with the first region 1001. According to an embodiment, a recess 1210 may be formed in a portion (e.g., a periphery (e.g., a first periphery and a second periphery)) where the s-patch element is positioned.

Reference number 1299 illustrates a cross-sectional when the s-patch element taken along the line C-C' of reference number 1298 is viewed in the −X direction. Referring to reference number 1299, for example, the region W1 may extend from the periphery part 1220 in the −Y direction by a length W3, and may include a recess 1210 with a thickness corresponding to the distance between the first region 1001 and the second region 1002. For another example, the region W2 may extend from the length periphery part 1220 in the −Y direction by the length W3, and may include a protrusion part (e.g., the recess 1210) having a thickness corresponding to the distance between the first region 1001 and the second region 1002.

According to an embodiment, the s-patch element may include a first conductive path 1201. For example, the first conductive path 1201 may extend from the region W1 in the +Y axis. The first conductive path 1201 may be positioned to be more adjacent to the first region 1001 than the second region 1002. For example, the first conductive path 1201 may extend to be parallel to the first region 1001. According to an embodiment, the second conductive path 1202 may extend from one end of the first conductive path 1201 in the −Z direction, and may electrically connect the first conductive path 1201 to the second region 1002. For example, the first conductive path 1201 may be positioned on the first printed circuit board 1020, and the second conductive path 1202 may be positioned on the first printed circuit board 1020 and the second printed circuit board 1030. For example, the second conductive path 1202 may include a plurality of conductive paths that are electrically connected through a connection member 1203 (e.g., a solder ball) positioned between the first printed circuit board 1020 and the second printed circuit board 1030.

According to an embodiment, an adhesive member for attaching the first printed circuit board 1020 and the second printed circuit board 1030 may be positioned between the first printed circuit board 1020 and the second printed circuit board 1030.

Figure 13:
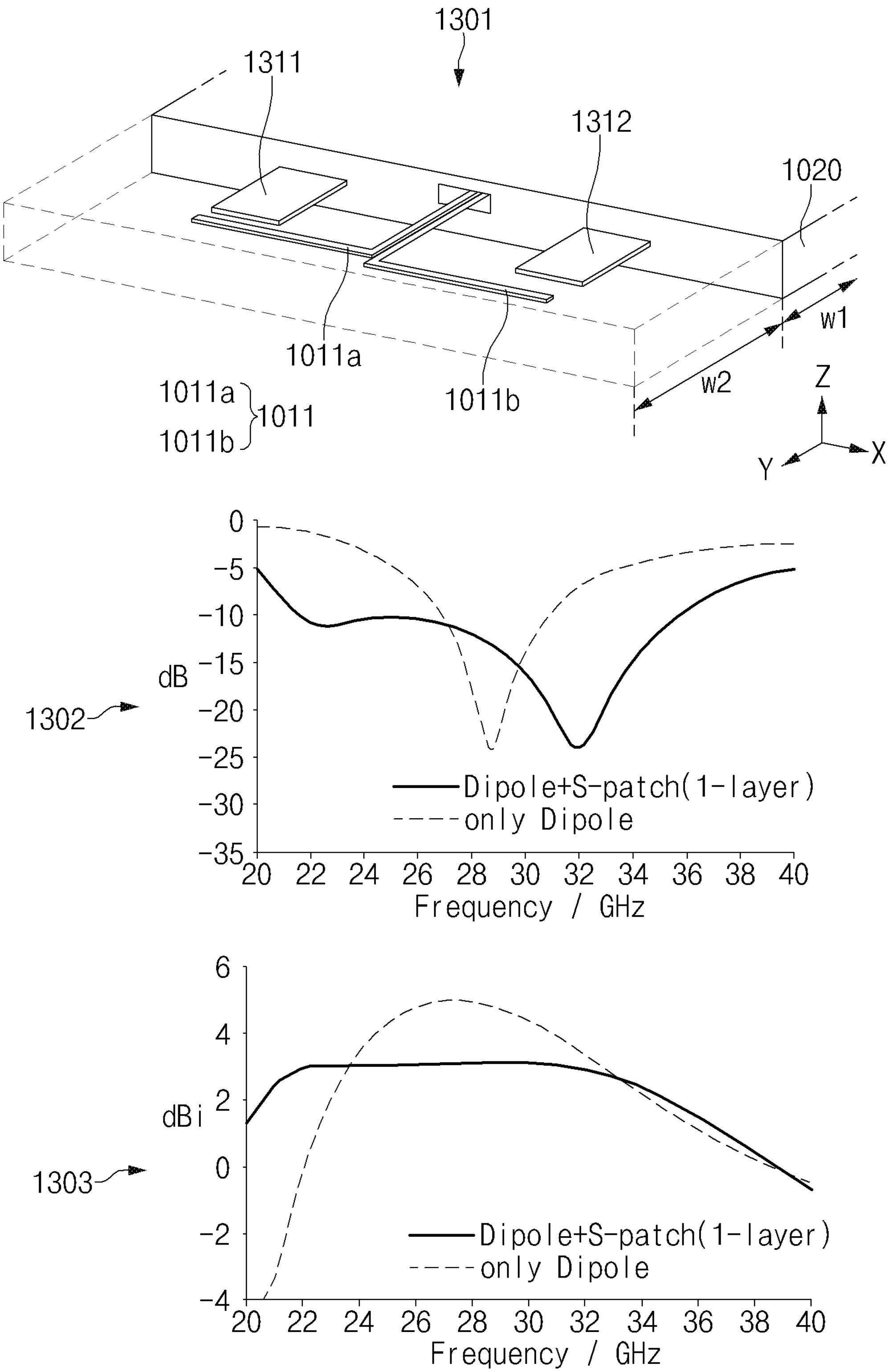
FIG. 13 illustrates a configuration of antenna elements according to one example according to an embodiment of the disclosure.

FIG. 13 illustrates a configuration 1301 of antenna elements according to one example according to an embodiment of the disclosure.

Referring to FIGS. 11 and 12, it is described that the second antenna array (e.g., the second antenna array AAR2 of FIG. 10) includes an s-patch element including a protrusion part in a plurality of layers. However, embodiments of the disclosure are not limited thereto.

Referring to FIG. 13, according to an embodiment, the conductive patterns (e.g., a first conductive pattern 1311 and a second conductive pattern 1312) and the dipole antenna 1011 of the third antenna array AAR3 may be implemented on the same layer. For example, each of the first conductive pattern 1311 and the second conductive pattern 1312 may be included in an s-patch element. For example, the first dipole antenna 1011, the first conductive pattern 1311, and the second conductive pattern 1312 may be disposed on or within one layer of the first printed circuit board 1020. In this case, the second printed circuit board (e.g., the second printed circuit board 1030 in FIG. 10) may be omitted.

In the example of FIG. 13, the first dipole antenna 1011 may be positioned between two conductive patterns (e.g., the first conductive pattern 1311 and the second conductive pattern 1312). For example, the first dipole antenna 1011 may not overlap with the first conductive pattern 1311 and the second conductive pattern 1312 on the X-Y plane.

In the case of the configuration 1301, a reflection coefficient feature may appear as illustrated in the graph of reference numeral 1302. Besides, as illustrated in the gain graph of reference numeral 1303, when a dipole antenna and the s-patch elements 1311 and 1312 are used together, broadband features may appear.

In the example of FIG. 13, feed may be provided to both the conductive pattern 1011*a* and the conductive pattern 1011*b* of the first dipole antenna 1011. In this case, differential feed with 180-degree phase difference may be provided to the two conductive patterns. For another example, one of the conductive pattern 1011*a* or the conductive pattern 1011*b* may be connected to a feed part and the other may be connected to a ground part.

Figure 14:
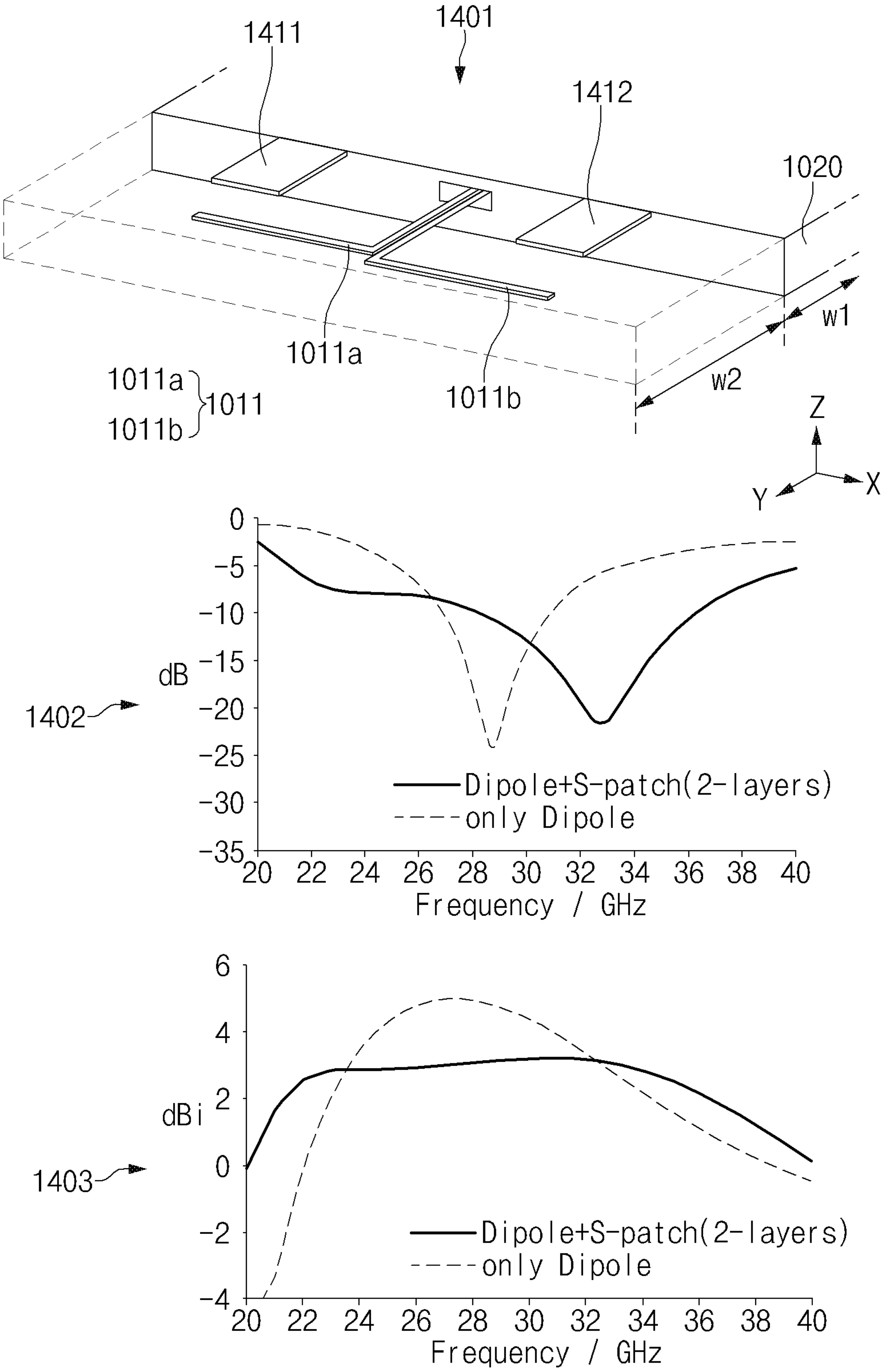
FIG. 14 illustrates a configuration of antenna elements according to another example according to an embodiment of the disclosure.

FIG. 14 illustrates a configuration 1401 of antenna elements according to an embodiment of the disclosure.

Referring to FIG. 14, according to an embodiment, the conductive patterns (e.g., a first conductive pattern 1411 and a second conductive pattern 1412) and the dipole antenna of the third antenna array (e.g., the third antenna array AAR3 of FIG. 10) may be implemented on different layers. For example, each of the first conductive pattern 1411 and the second conductive pattern 1412 may be included in an s-patch element. For example, the first dipole antenna 1011 may be disposed on or within the first layer of the first printed circuit board 1020. The first conductive pattern 1411 and the second conductive pattern 1412 may be disposed on or within the second layer of the first printed circuit board 1020. For example, the second layer may be a different layer from the first layer. For example, the second layer may be one of the outermost layers of the first printed circuit board 1020. In this case, the second printed circuit board (e.g., the second printed circuit board 1030 in FIG. 10) may be omitted.

In the example of FIG. 14, the first dipole antenna 1011 may be positioned between two conductive patterns (e.g., the first conductive pattern 1411 and the second conductive pattern 1412). For example, the first dipole antenna 1011 may not overlap with the first conductive pattern 1411 and the second conductive pattern 1412 on the X-Y plane. The first dipole antenna 1011 may not overlap the first conductive pattern 1411 and the second conductive pattern 1412 on the Z axis. In the case of the configuration 1401, a reflection coefficient feature may appear as illustrated in the graph of reference numeral 1402. Besides, as illustrated in the gain graph of reference numeral 1403, when a dipole antenna and s-patch elements (e.g., the first conductive pattern 1411 and the second conductive pattern 1412) are used together, broadband features may appear.

In the example of FIG. 14, feed may be provided to both the conductive pattern 1011*a* and the conductive pattern 1011*b* of the first dipole antenna 1011. In this case, differential feed with 180-degree phase difference may be provided to the two conductive patterns. For another example, one of the conductive pattern 1011*a* or the conductive pattern 1011*b* may be connected to a feed part and the other may be connected to a ground part.

Figure 15:
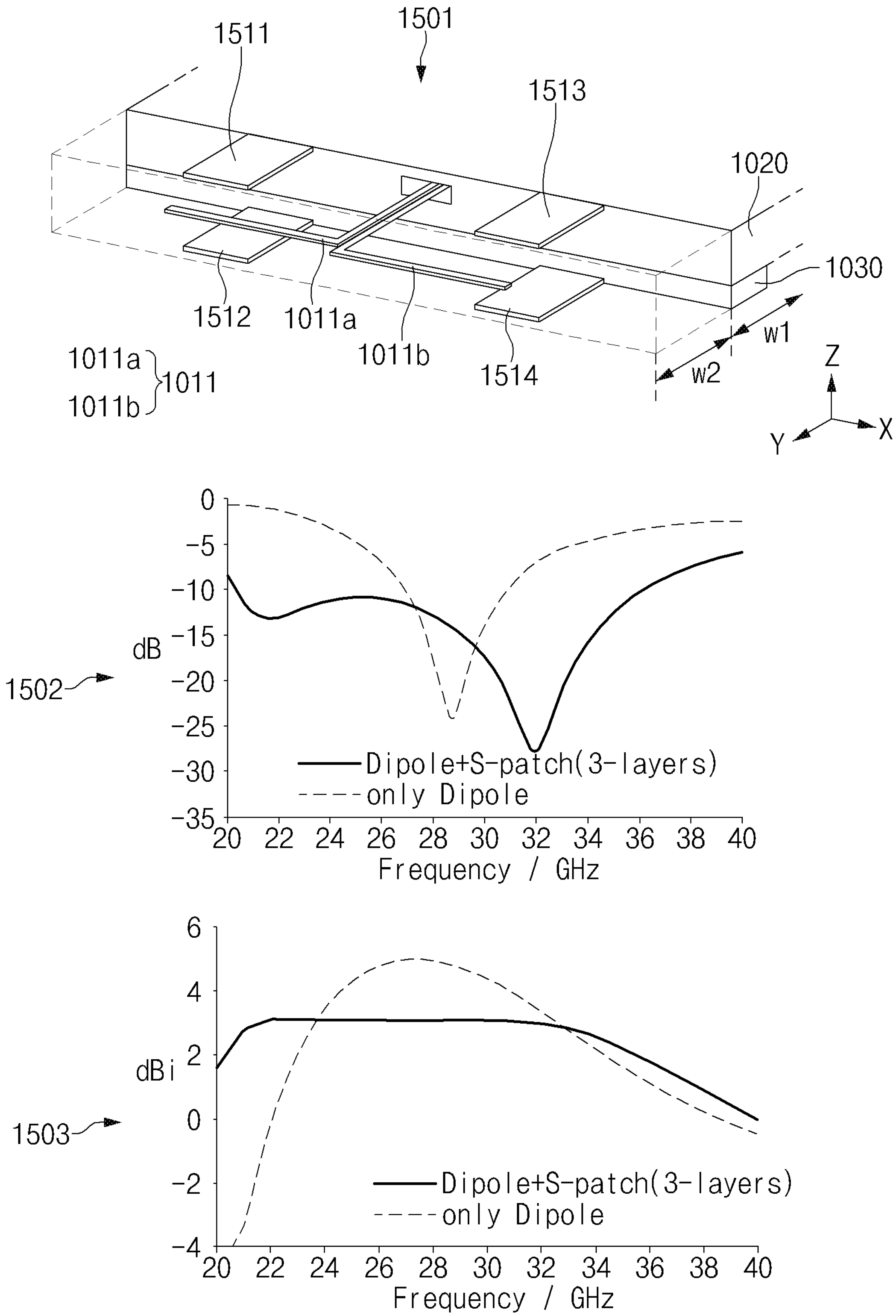
FIG. 15 illustrates a configuration of antenna elements according to another example according to an embodiment of the disclosure.

FIG. 15 illustrates a configuration 1501 of antenna elements according to an embodiment of the disclosure.

The partial configuration of the second antenna array (e.g., the second antenna array AAR2 in FIG. 10) and the third antenna array (e.g., the third antenna array AAR3 in FIG. 10) is illustrated in FIG. 15. According to an embodiment, the dipole antenna of the third antenna array AAR3 and the s-patch element of the second antenna array AAR2 may be implemented on different layers. For example, each of a first conductive pattern 1511, a second conductive pattern 1512, a third conductive pattern 1513, and a fourth conductive pattern 1514 may be included in the s-patch element. For example, the first dipole antenna 1011 may be disposed on or within the first layer of the first printed circuit board 1020. The first conductive pattern 1511 and the third conductive pattern 1513 may be disposed on or within the second layer of the first printed circuit board 1020. The second conductive pattern 1512 and the fourth conductive pattern 1514 may be disposed on or within the third layer of the second printed circuit board 1030. The first conductive pattern 1511 and the second conductive pattern 1512 may substantially overlap with each other on the X-Y plane and may be spaced from each other on the Z axis. The third conductive pattern 1513 and the fourth conductive pattern 1514 may substantially overlap with each other on the X-Y plane and may be spaced from each other on the Z axis. For example, the second layer may be a different layer from the first layer and the third layer.

In the example of FIG. 15, the first dipole antenna 1011 may be positioned between two s-patch elements (e.g., the first conductive pattern 1511, the second conductive pattern 1512, the third conductive pattern 1513, and the fourth conductive pattern 1514). For example, the first dipole antenna 1011 may not overlap with the s-patch elements on the X-Y plane. The first dipole antenna 1011 may not overlap with the s-patch element on the Z axis. In the case of the configuration 1501, a reflection coefficient feature may appear as illustrated in the graph of reference numeral 1502. Besides, as illustrated in the gain graph of reference numeral 1503, when a dipole antenna and an s-patch element are used together, broadband features may appear.

In the example of FIG. 15, feed may be provided to both the conductive pattern 1011*a* and the conductive pattern 1011*b* of the first dipole antenna 1011. In this case, differential feed with 180-degree phase difference may be provided to the two conductive patterns. For another example, one of the conductive pattern 1011*a* or the conductive pattern 1011*b* may be connected to a feed part and the other may be connected to a ground part.

Figure 16:
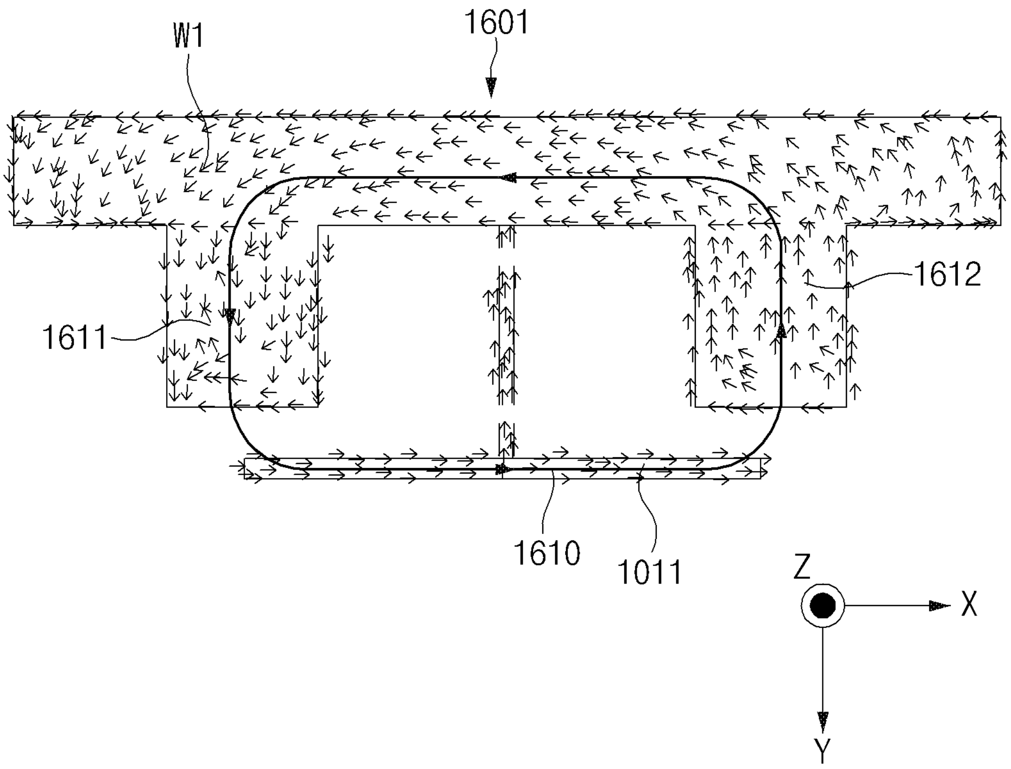
FIG. 16 illustrates a current flow formed by a second antenna array and a third antenna array according to an embodiment of the disclosure.

FIG. 16 illustrates a current flow 1601 formed by a first antenna array according to an embodiment of the disclosure.

In the above-described examples, the dipole antenna (e.g., the first dipole antenna 1011) on the XY plane may be disposed not to overlap with a conductive pattern (e.g., a first conductive pattern 1611 and a second conductive pattern 1612) electrically connected to a ground. For example, the conductive patterns 1611 and 1612 electrically connected to the ground may be included in s-patch elements. For example, a dipole antenna may be positioned between the s-patch elements (e.g., the first conductive pattern 1611 and the second conductive pattern 1612). In an embodiment, when the first dipole antenna 1011 is positioned to overlap with the s-patch element on the XY plane (e.g., between the first region 1001 and the second region 1002 of FIG. 12), the first dipole antenna 1011 may extend in the +Y direction for the isolation from the s-patch element. In embodiments of the disclosure, the dipole antenna may not overlap with the s-patch element on the X-Y plane. According to embodiments of the disclosure, the size of the antenna module (e.g., the second antenna module 830 of FIG. 8) may be reduced. For example, the dipole antenna may be adjacent to the s-patch element being the ground, thereby increasing the capacitance. In this case, the effect of matching for adjusting an electrical length due to the capacitance may occur. Accordingly, the electrical length of the dipole antenna may be increased due to the matching effect. For example, the resonance frequency may be lowered due to the capacitance, and the length of a dipole antenna for the same resonance frequency may be relatively short.

According to an embodiment of the disclosure, as illustrated in FIG. 16, a current path 1610 similar to a closed-loop may be generated by a dipole antenna (e.g., the first dipole antenna 1011) and conductive patterns (e.g., the first conductive pattern 1611 and the second conductive pattern 1612) positioned on both sides of the dipole antenna. In this case, a magnetic field may be generated by the current path. Accordingly, the first dipole antenna 1011 may operate similarly to a magnetic dipole due to the current path 1610. The first dipole antenna 1011 may operate by generating the magnetic dipole current path 1610 for generating a resonance similar to the magnetic dipole in addition to the existing resonance. The antenna module 1000 may have a broadband feature due to the resonance in a frequency band close to the current path for the existing resonance and the additional current path 1610. According to an embodiment of the disclosure, the broadband feature of the third antenna array (e.g., the third antenna array AAR3 of FIG. 10) may be improved. For example, the third antenna array AAR3 may have good broadband features by operating similarly to a magnetic dipole.

Figure 17:
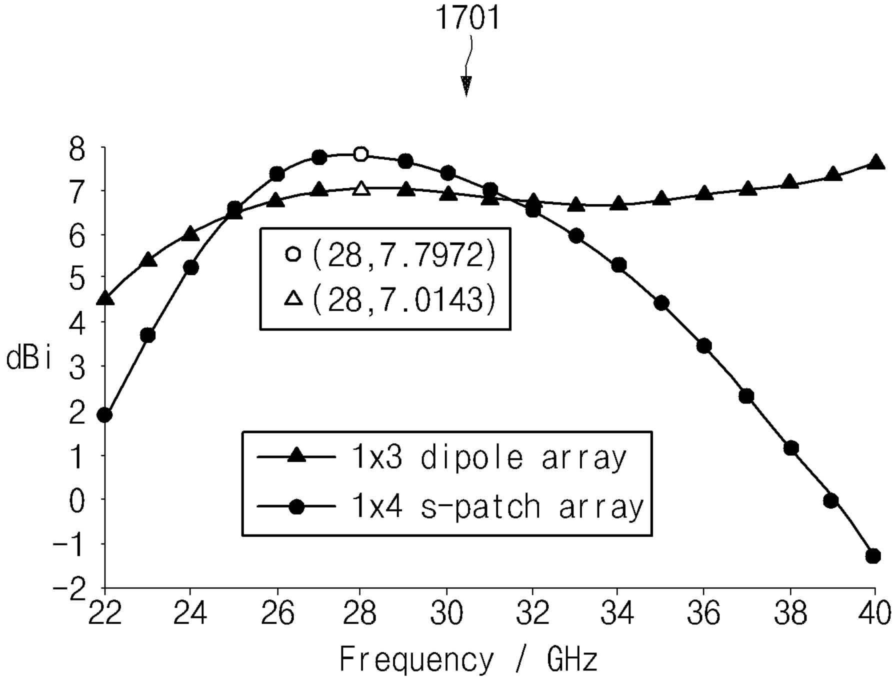
FIG. 17 illustrates gains of a second antenna array and a third antenna array according to an embodiment of the disclosure.

FIG. 17 illustrates gains of a second antenna array and a third antenna array according to an embodiment of the disclosure.

Referring to FIG. 17, the gains of a third antenna array (e.g., a dipole antenna array) (e.g., the first dipole antenna 1011, the second dipole antenna 1013, and the third dipole antenna 1015 of FIG. 10) and a second antenna array (e.g., s-patch array) (e.g., the first region 1001, the second region 1002, the third region 1003, the fourth region 1004, the fifth region 1005, the sixth region 1006, the seventh region 1007, and the eighth region 1008 of FIG. 10) are illustrated in graph 1701. As illustrated in FIG. 17, the third antenna array may have a gain feature of 7.4 decibels above an isotropic radiator (dBi) in the 28-GHz band. The second antenna array may have the gain feature of 7.9 dBi in the 28-GHz band.

Figure 18:
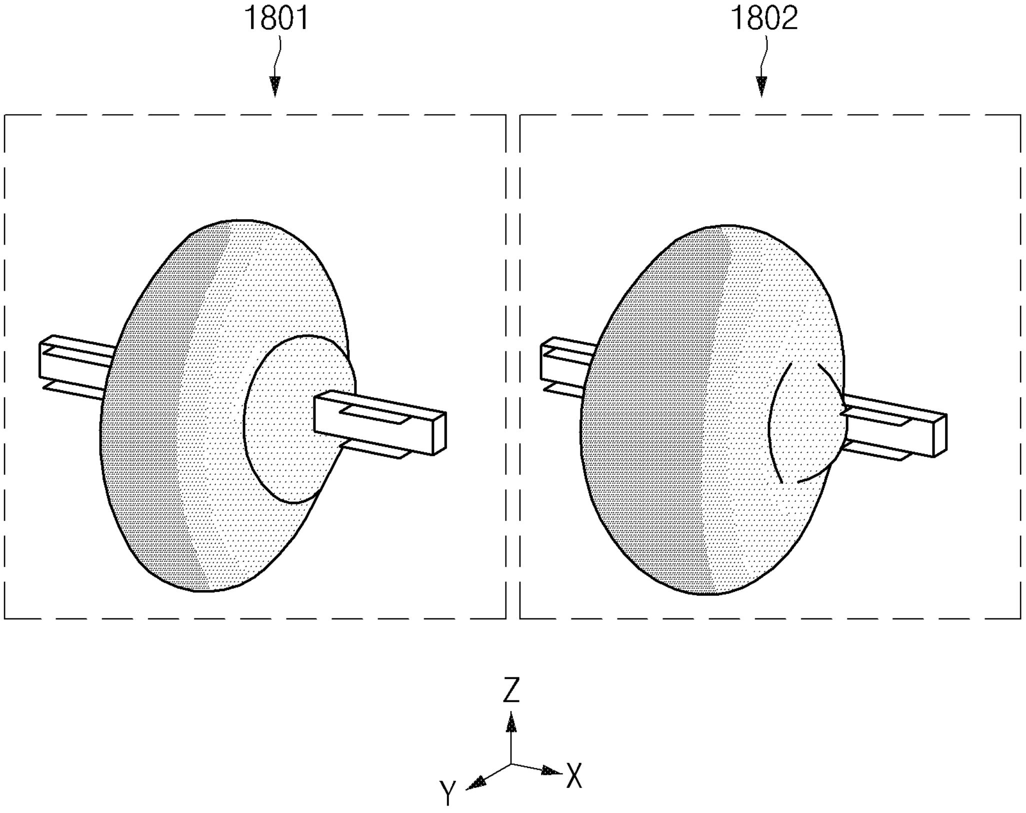
FIG. 18 illustrates beam patterns of a second antenna array and a third antenna array according to an embodiment of the disclosure.

FIG. 18 illustrates beam patterns of a second antenna array and a third antenna array according to an embodiment of the disclosure.

Reference numeral 1801 illustrates one beam pattern capable of being generated by a second antenna array (e.g., an s-patch element array) (e.g., the first region 1001, the second region 1002, the third region 1003, the fourth region 1004, the fifth region 1005, the sixth region 1006, the seventh region 1007, and the eighth region 1008 of FIG. 10).

Reference numeral 1802 illustrates one beam pattern capable of being generated by a third antenna array (e.g., a dipole antenna array) (e.g., the first dipole antenna 1011, the second dipole antenna 1013, and the third dipole antenna 1015 of FIG. 10).

Figure 19:
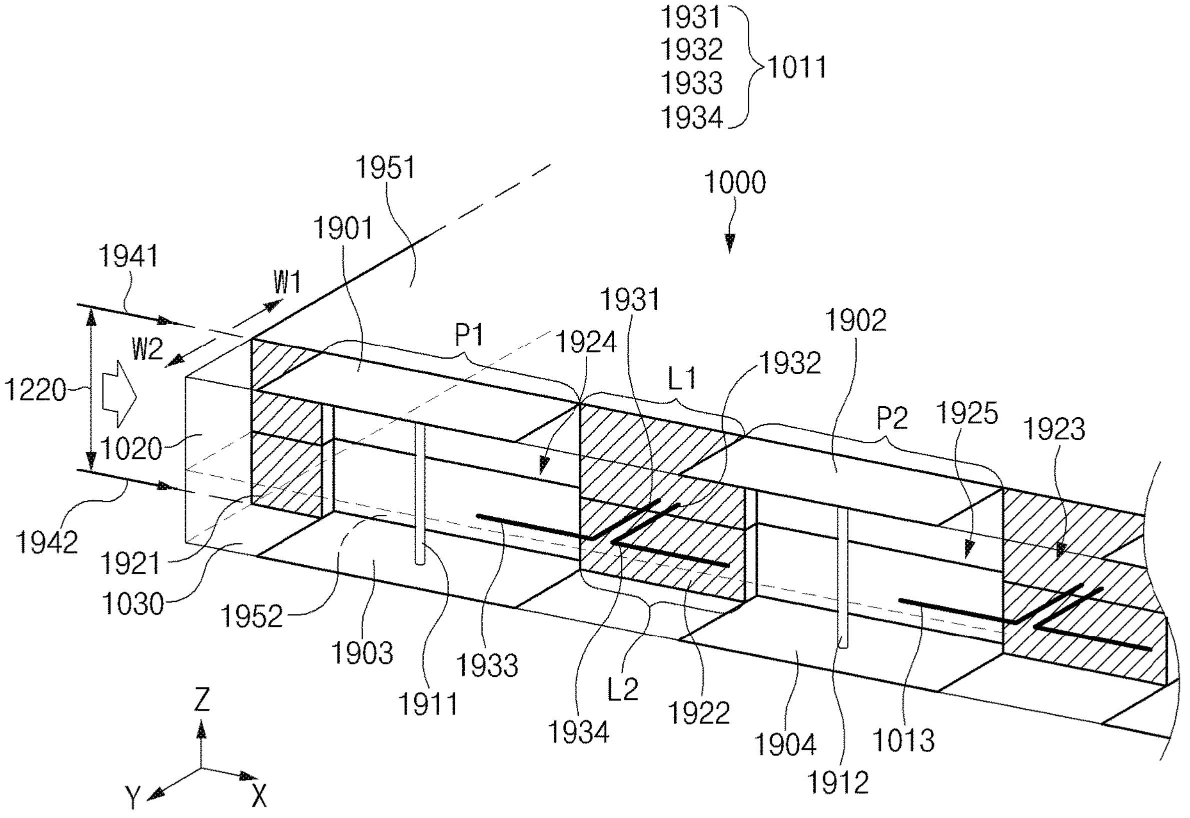
FIG. 19 illustrates a partial configuration of an antenna module according to an embodiment of the disclosure.

FIG. 19 illustrates a partial configuration of the antenna module 1000, according to an embodiment of the disclosure.

According to an embodiment, the antenna module 1000 may be positioned inside the housing of an electronic device (e.g., the mobile electronic device 200 of FIG. 2). Referring to FIGS. 2 and 3, the housing may include a first plate (e.g., the first surface 210A), a second plate (e.g., the second surface 210B) facing away from the first plate, and a side member (e.g., the side surface 210C) surrounding a space between the first plate and the second plate and coupled with the second plate or integrally formed with the second plate.

For example, the display (e.g., the display device 160 of FIG. 1) may be viewable through at least part of the first plate.

According to an embodiment, an antenna structure (e.g., the configuration of the antenna module 1000 other than an RFIC) may be positioned in the housing. For example, the antenna structure may include a first conductive layer 1951. The first conductive layer 1951 may include a first surface facing the first direction (e.g., +Z direction), a second surface facing the second direction (e.g., −Z direction) opposite the first direction, and a first periphery 1941 extending in the third direction (e.g., +X direction) perpendicular to the first direction. The first conductive layer 1951 may include a first region 1901 protruding in a fourth direction (+Y direction) perpendicular to the third direction from a first portion P1 of the first periphery 1941 and a second region 1902 spaced from the first portion P1 in the third direction by a first distance L1 and protruding in the fourth direction from a second portion P2 of the first periphery 1941.

According to an embodiment, the antenna structure may include a second conductive layer 1952. The second conductive layer 1952 may be spaced from the first conductive layer 1951 to face the first conductive layer 1951. The second conductive layer 1952 may include a third face facing the first direction, a fourth face facing the second direction, and a second periphery 1942 extending in the third direction. The second conductive layer 1952 may further include a third region 1903 protruding in the fourth direction from the second periphery 1942 to face the first region 1901, and a fourth region 1904 spaced from the third region 1903 in the third direction by a second distance L2 and protruding in the fourth direction from the second periphery 1942 to face the second region 1902. For example, the first distance L1 and the second distance L2 may be substantially the same as each other.

According to an embodiment, when viewed from above the first surface, the antenna structure may include a first conductive path 1911 overlapping with the first region 1901, partially extending in the fourth direction to be closer to the first conductive layer 1951 than the second conductive layer 1952, and electrically connected to the third region 1903. When viewed from above the first surface, the antenna structure may include a second conductive path 1912 overlapping with the second region 1902, partially extending in the fourth direction to be closer to the first conductive layer 1951 than the second conductive layer 1952, and electrically connected to the fourth region 1904.

According to an embodiment, when viewed from above the first surface, the antenna structure may include a third conductive path 1931 interposed between the first region 1901 and the second region 1902 and extending in the fourth direction. When viewed from above the first surface, the antenna structure may include a fourth conductive path 1932 interposed between the first region 1901 and the second region 1902 and being adjacent to the third conductive path 1931 to extend in the fourth direction. the antenna structure may include a first conductive pattern 1933 extending from an end of the third conductive path 1931 in a fifth direction (e.g., −X direction) opposite to the third direction and a second conductive pattern 1934 extending from an end of the fourth conductive path 1932 in the third direction. According to an embodiment, the first conductive pattern 1933 and the second conductive pattern 1934 may form a dipole antenna together.

For example, the electronic device may include a wireless communication circuit (e.g., the third RFIC 526 of FIG. 5) electrically connected to at least one of the first conductive path 1911, the second conductive path 1912, the third conductive path 1931, and the fourth conductive path 1932 and configured to transmit and/or receive a signal having a frequency between 3 GHz and 100 GHz.

According to an embodiment, the antenna structure may further include a first printed circuit board 1020 and a second printed circuit board 1030. For example, the first printed circuit board 1020 may include a first conductive layer 1051, a part of the first conductive path 1911, a part of the second conductive path 1912, the third conductive path 1931, the fourth conductive path 1932, the first conductive pattern 1933, and the second conductive pattern 1934. The second printed circuit board 1030 may include another part of the first conductive path 1911 and another part of the second conductive path 1912.

According to an embodiment, the first printed circuit board 1020 may include a third surface facing the first direction and a fourth surface facing the second direction, and the second printed circuit board 1030 may include a fifth surface facing the first direction and a sixth surface facing the second direction. The fifth surface may be configured to face a first portion of the fourth surface.

According to an embodiment, the wireless communication circuit may be disposed in at least part of remaining portions of the fourth surface other than the first portion and is operatively connected to a communication processor (e.g., the second communication processor 514) disposed inside the housing.

According to an embodiment, the antenna structure may further include an insulating material interposed between the first conductive layer 1951 and the second conductive layer 1952.

According to an embodiment, the antenna structure may further include a conductive wall electrically connected from the first conductive layer 1951 to the second conductive layer 1952. When viewed from above the first surface, the conductive wall includes a first conductive wall 1921. For example, the first conductive wall 1921 may be formed between a first end of the first periphery 1941 and the first portion P1 of the first periphery 1941. When viewed from above the first surface, the conductive wall may further include a second conductive wall 1922 formed the first portion P1 and the second portion P2. When viewed from above the first surface, the conductive wall may include a third conductive wall 1923 formed between a second end and the second portion P2 of the first periphery 1941.

For example, when viewed from above the first surface, the conductive wall may include a fourth conductive wall 1924 extending from the first conductive wall 1921 to the second conductive wall 1922 to be recessed in a sixth direction (e.g., −Y direction) opposite to the fourth direction from the first portion P1 of the first periphery 1941. For example, when viewed from above the first surface, the conductive wall may include a fifth conductive wall 1925 extending from the second conductive wall 1922 to the third conductive wall 1923 to be recessed in the sixth direction from the second portion P2 of the first periphery 1941. For example, the third conductive path 1931 and the fourth conductive path 1932 extend from the second conductive wall 1922.

Referring to FIG. 19, the isolation between the s-patch element and the dipole antenna may be improved because the dipole antenna is positioned between the s-patch elements.

According to an embodiment, an electronic device (e.g., the electronic device 101 of FIG. 1) may include housing.

Returning to FIGS. 2 and 3, the housing may include a first plate (e.g., the first surface 210A), a second plate (e.g., the second surface 210B) facing away from the first plate, and a side member (e.g., the side surface 210C) surrounding a space between the first plate and the second plate and coupled with the second plate or integrally formed with the second plate. For example, the display (e.g., the display device 160 of FIG. 1) may be viewable through at least part of the first plate.

According to an embodiment, the electronic device may include a first printed circuit board (e.g., the second printed circuit board 820) including a first surface facing a first direction (+Z direction) and a second surface facing a second direction (−Z direction) opposite to the first direction and a second printed circuit board (e.g., the third printed circuit board 1020) coupled to a part of the second surface, and may include an antenna structure disposed inside the housing. The electronic device may include a wireless communication circuit (e.g., the third RFIC 526 of FIG. 5) coupled to the antenna structure and configured to transmit and receive a signal having a frequency between 3 GHz and 100 GHz.

For example, the antenna structure may include a conductive region (e.g., the region W1) extending in a fourth direction (−Y direction) perpendicular to the first direction and the third direction from the periphery part 1220 extending in a third direction (+X direction) perpendicular to the first direction and a non-conductive region (e.g., the region W2) extending in a fifth direction (+Y direction) opposite to the fourth direction from the periphery part 1220.

For example, the conductive region may further include first conductive protrusion parts 1901 and 1903 protruding in the fifth direction from the first portion P1 of the periphery part 1220 and second conductive protrusion parts 1902 and 1904 protruding in the fifth direction from the second portion P2 spaced from the first portion by a first distance L1 on the periphery part 1220.

The antenna structure may further include a first conductive path (e.g., 1932) extending in the fifth direction, a second conductive path (e.g., 1931) extending in the fifth direction between the first portion P1 and the second portion P2, a first conductive pattern (e.g., 1934) extending in the third direction from an end of the first conductive path, and a second conductive pattern (e.g., 1933) extending in a sixth direction (e.g., −X direction) opposite to the third direction from an end of the second conductive path, between the first portion P1 and the second portion P2. The wireless communication circuit may be electrically connected to at least one of the first conductive path or the second conductive path.

According to an embodiment, the first conductive protrusion part may include a first conductive layer (e.g., the first region 1901) extending in the fifth direction from the first portion P1 on the periphery part of the first printed circuit board and a second conductive layer (e.g., the third region 1903) extending in the fifth direction from the first portion P1 on the periphery part of the second printed circuit board. The second conductive protrusion part may include a third conductive layer (e.g., the second region 1902) extending in the fifth direction from the second portion P2 on the periphery part of the first printed circuit board and a fourth conductive layer (e.g., the fourth region 1904) extending in the fifth direction from the second portion P2 on the periphery part of the second printed circuit board.

According to an embodiment, when viewed from above the first surface, the antenna structure may further include a third conductive path (e.g., 1911) protruding in the fifth direction from the conductive region to extend in the fourth direction between the first conductive layer and the second conductive layer at one end and a fourth conductive path (e.g., 1912) protruding in the fifth direction from the conductive region to extend in the fifth direction between the third conductive layer and the fourth conductive layer at one end. For example, the wireless communication circuit may be electrically connected between the third conductive path and the fourth conductive path.

According to an embodiment, when the first surface is viewed from above the top, the wireless communication circuit may be disposed in at least part of the remaining portion of a second surface other than a portion where the first printed circuit board and the second printed circuit board overlap with each other. The wireless communication circuit may be operatively connected to a communication processor disposed inside the housing. For example, the antenna structure may further include a shield can coupled to the remaining portions of the second surface and configured to electrically shield the wireless communication circuit.

According to an embodiment, the first conductive path, the second conductive path, the first conductive pattern, and the second conductive pattern may constitute at least part of the first dipole antenna. For example, the antenna structure may further include third conductive protrusion parts (e.g., the fifth region 1005 and the sixth region 1006 of FIG. 10) protruding in the fifth direction from a third portion (e.g., the region corresponding to the fifth region 1005 and the sixth region 1006 of FIG. 10) spaced from the second portion P2 by the first distance L1 on the periphery part. For example, the antenna structure may further include fourth conductive protrusion parts (e.g., the seventh region 1007 and the eighth region 1008 of FIG. 10) protruding in the fifth direction from a fourth portion (e.g., the region corresponding to the seventh region 1007 and the eighth region 1008) spaced from the third portion (e.g., the region corresponding to the fifth region 1005 and the sixth region 1006 of FIG. 10) by the first distance on the periphery part.

For example, the third conductive protrusion part may include a fifth conductive layer (e.g., the fifth region 1005 of FIG. 10) extending in the fifth direction from the third portion on the periphery part of the first printed circuit board and a sixth conductive layer (e.g., the sixth region 1006 of FIG. 10) extending in the fifth direction from the third portion on the first periphery of the second printed circuit board. The fourth conductive protrusion part may include a seventh conductive layer (e.g., the seventh region 1007 of FIG. 10) extending in the fifth direction from the fourth portion on the periphery part of the first printed circuit board and an eighth conductive layer (e.g., the eighth region 1008 of FIG. 10) extending in the fifth direction from the fourth portion on the periphery part of the second printed circuit board.

The antenna structure may further include a second dipole antenna (e.g., the second dipole antenna 1013 of FIG. 10) and a third dipole antenna (e.g., the third dipole antenna 1015 of FIG. 10). The second dipole antenna may include a fifth conductive path extending in the fifth direction between the second portion and the third portion, a sixth conductive path extending in the fifth direction between the second portion and the third portion, a fifth conductive pattern extending in the third direction from an end of the fifth conductive path, and a sixth conductive pattern extending in the sixth direction from an end of the sixth conductive path. The third dipole antenna may include a seventh conductive path extending in the fifth direction between the third portion and the fourth portion, an eighth conductive path extending in the fifth direction between the third portion and the fourth portion, a seventh conductive pattern extending in the third direction from an end of the seventh conductive path, and an eighth conductive pattern extending in the sixth direction from an end of the eighth conductive path.

According to an embodiment, the wireless communication circuit may perform horizontal polarization using at least one of the first dipole antenna, the second dipole antenna, or the third dipole antenna and may perform vertical polarization using at least one of the first conductive protrusion part, the second conductive protrusion part, the third conductive protrusion part, or the fourth conductive protrusion part.

According to an embodiment, the antenna structure may further include a plurality of conductive plates (e.g., the second antenna array AAR2 of FIG. 10) arranged on the first surface of the conductive region.

According to an embodiment disclosed in this specification, an antenna module with the reduced size may be provided.

According to an embodiment disclosed in this specification, an antenna module having broadband features may be provided.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a housing including a first plate, a second plate facing away from the first plate, and a side member surrounding a space between the first plate and the second plate and coupled with the second plate or integrally formed with the second plate;

a display viewable through at least part of the first plate;

an antenna structure disposed inside the housing, wherein the antenna structure comprises:

a first conductive layer comprising:

a first surface facing a first direction;

a first periphery extending in a third direction perpendicular to the first direction;

a first region protruding in a fourth direction perpendicular to the third direction from a first portion of the first periphery; and a second region spaced from the first region in the third direction by a first distance and protruding in the fourth direction from a second portion of the first periphery, a second conductive layer spaced from the first conductive layer and facing the first conductive layer, the second conductive layer comprising:

a second periphery extending in the third direction;

a third region protruding in the fourth direction from the second periphery to face the first region; and a fourth region spaced from the third region in the third direction by a second distance and protruding in the fourth direction from the second periphery to face the second region, a first conductive pattern extending from an end of a third conductive path in a fifth direction opposite to the third direction, and a second conductive pattern extending from an end of a fourth conductive path in the third direction, wherein the first conductive pattern and the second conductive pattern form a dipole antenna, wherein the first region and the third region comprise a first shortened-patch (s-patch) element, wherein the second region and the fourth region comprise a second s-patch element, and wherein the dipole antenna is disposed substantially between the first s-patch element and the second s-patch element.

2. The electronic device of claim 1, further comprising:

a wireless communication circuit electrically connected to at least one of a first conductive path, a second conductive path, the third conductive path, or the fourth conductive path, and configured to transmit or receive a signal having a frequency between 3 gigahertz (GHz) and 100 GHz.

3. The electronic device of claim 1, wherein the first conductive layer further comprises:

a second surface facing a second direction opposite to the first direction, and wherein the second conductive layer further comprises:

a third surface facing the first direction; and a fourth surface facing the second direction.

4. The electronic device of claim 3, further comprising:

a first conductive path overlapping with the first region when viewed from above the first surface, partially extending in the fourth direction to be closer to the first conductive layer than the second conductive layer, and electrically connected to the third region; and a second conductive path overlapping with the second region when viewed from above the first surface, partially extending in the fourth direction to be closer to the first conductive layer than the second conductive layer, and electrically connected to the fourth region.

5. The electronic device of claim 4, wherein the third conductive path comprises a conductive path interposed between the first region and the second region and extending in the fourth direction, when viewed from above the first surface, and wherein the fourth conductive path comprises a conductive path interposed between the first region and the second region and being adjacent to the third conductive path to extend in the fourth direction, when viewed from above the first surface.

6. The electronic device of claim 5, wherein the antenna structure further comprises a first printed circuit board and a second printed circuit board, wherein the first printed circuit board comprises the first conductive layer, a part of the first conductive path, a part of the second conductive path, the third conductive path, the fourth conductive path, the first conductive pattern, and the second conductive pattern, and wherein the second printed circuit board comprises another part of the first conductive path and another part of the second conductive path.

7. The electronic device of claim 6, wherein the first printed circuit board further comprises the third surface facing the first direction and the fourth surface facing the second direction, wherein the second printed circuit board comprises a fifth surface facing the first direction and a sixth surface facing the second direction, and wherein the fifth surface is configured to face a first portion of the fourth surface.

8. The electronic device of claim 7, wherein a wireless communication circuit is disposed in at least part of remaining portions of the fourth surface other than the first portion of the fourth surface and is operatively connected to a communication processor disposed inside the housing.

9. The electronic device of claim 3, wherein the antenna structure further comprises a conductive wall electrically connecting the first conductive layer to the second conductive layer, and wherein, when viewed from above the first surface, the conductive wall comprises:

a first conductive wall disposed between a first end of the first periphery and the first portion of the first periphery;

a second conductive wall disposed between the first portion of the first periphery and the second portion of the first periphery; and a third conductive wall disposed between a second end of the first periphery and the second portion of the first periphery.

10. The electronic device of claim 9, wherein, when viewed from above the first surface, the antenna structure further comprises:

a fourth conductive wall extending from the first conductive wall to the second conductive wall and recessed in a sixth direction opposite to the fourth direction from the first portion of the first periphery; and a fifth conductive wall extending from the second conductive wall to the third conductive wall and recessed in the sixth direction from the second portion of the first periphery.

11. The electronic device of claim 10, wherein the third conductive path and the fourth conductive path extend from the second conductive wall.

12. The electronic device of claim 1, wherein the antenna structure further comprises an insulating material interposed between the first conductive layer and the second conductive layer.

13. The electronic device of claim 1, wherein the first distance and the second distance are a same distance.

14. An antenna circuitry comprising:

an antenna structure comprising:

a first conductive layer comprising:

a first surface facing a first direction;

a first periphery extending in a third direction perpendicular to the first direction;

a first region protruding in a fourth direction perpendicular to the third direction from a first portion of the first periphery; and a second region spaced from the first region in the third direction by a first distance and protruding in the fourth direction from a second portion of the first periphery, a second conductive layer spaced from the first conductive layer and facing the first conductive layer, wherein the second conductive layer comprises:

a second periphery extending in the third direction;

a third region protruding in the fourth direction from the second periphery to face the first region; and a fourth region spaced from the third region in the third direction by a second distance and protruding in the fourth direction from the second periphery to face the second region, a first conductive pattern extending from an end of a third conductive path in a fifth direction opposite to the third direction, and a second conductive pattern extending from an end of a fourth conductive path in the third direction, wherein the first conductive pattern and the second conductive pattern form a dipole antenna, wherein the first region and the third region comprise a first shortened-patch (s-patch) element, wherein the second region and the fourth region comprise a second s-patch element, and wherein the dipole antenna is disposed substantially between the first s-patch element and the second s-patch element.

15. The antenna circuitry of claim 14, further comprising:

a wireless communication circuit electrically connected to at least one of a first conductive path, a second conductive path, the third conductive path, or the fourth conductive path, and configured to transmit or receive a signal having a frequency between 3 gigahertz (GHz) and 100 GHz.

16. The antenna circuitry of claim 14, wherein the first conductive layer further comprises:

a second surface facing a second direction opposite to the first direction, and wherein the second conductive layer further comprises:

a third surface facing the first direction; and a fourth surface facing the second direction.

17. The antenna circuitry of claim 16, further comprising:

a first conductive path overlapping with the first region, partially extending in the fourth direction to be closer to the first conductive layer than the second conductive layer, and electrically connected to the third region, when viewed from above the first surface; and a second conductive path overlapping with the second region, partially extending in the fourth direction to be closer to the first conductive layer than the second conductive layer, and electrically connected to the fourth region, when viewed from above the first surface.

18. The antenna circuitry of claim 17, wherein the third conductive path comprises a conductive path interposed between the first region and the second region and extending in the fourth direction, when viewed from above the first surface, and wherein the fourth conductive path comprises a conductive path interposed between the first region and the second region and being adjacent to the third conductive path to extend in the fourth direction, when viewed from above the first surface.

19. The antenna circuitry of claim 18, wherein the antenna structure further comprises a first printed circuit board and a second printed circuit board, wherein the first printed circuit board comprises the first conductive layer, a part of the first conductive path, a part of the second conductive path, the third conductive path, the fourth conductive path, the first conductive pattern, and the second conductive pattern, and wherein the second printed circuit board comprises another part of the first conductive path and another part of the second conductive path.

20. The antenna circuitry of claim 19, wherein the first printed circuit board further comprises a third surface facing the first direction and a fourth surface facing the second direction, wherein the second printed circuit board further comprises a fifth surface facing the first direction and a sixth surface facing the second direction, and wherein the fifth surface is configured to face a first portion of the fourth surface.

21. The antenna circuitry of claim 20, wherein a wireless communication circuit is disposed in at least part of remaining portions of the fourth surface other than the first portion of the fourth surface, and is operatively connected to a communication processor.

22. The antenna circuitry of claim 16, wherein the antenna structure further comprises a conductive wall electrically connecting the first conductive layer to the second conductive layer, wherein, when viewed from above the first surface, the conductive wall comprises:

a first conductive wall disposed between a first end of the first periphery and the first portion of the first periphery;

a second conductive wall disposed between the first portion of the first periphery and the second portion of the first periphery; and a third conductive wall disposed between a second end of the first periphery and the second portion of the first periphery.

23. The antenna circuitry of claim 22, wherein, when viewed from above the first surface, the antenna structure further comprises:

a fourth conductive wall extending from the first conductive wall to the second conductive wall and recessed in a sixth direction opposite to the fourth direction from the first portion of the first periphery; and a fifth conductive wall extending from the second conductive wall to the third conductive wall and recessed in the sixth direction from the second portion of the first periphery.

24. The antenna circuitry of claim 23, wherein the third conductive path and the fourth conductive path extend from the second conductive wall.

25. The antenna circuitry of claim 14, wherein the antenna structure further comprises an insulating material interposed between the first conductive layer and the second conductive layer.

26. The antenna circuitry of claim 14, wherein the first distance and the second distance are a same distance.

* * * * *